United States Patent
Gonzalez Vidal et al.

(10) Patent No.: US 10,414,874 B2
(45) Date of Patent: Sep. 17, 2019

(54) POLYSILOXANE-POLYCARBONATE COPOLYMERS AND METHOD FOR PRODUCTION THEREOF

(71) Applicant: SABIC GLOBAL TECHNOLOGIES B.V., Bergen op Zoom (NL)

(72) Inventors: Nathalie Gonzalez Vidal, Cartagena (ES); James Franklin Hoover, Evansville, IN (US); Fabrizio Micciche, Breda (NL); Robert van de Grampel, Tholen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 25 days.

(21) Appl. No.: 15/519,197

(22) PCT Filed: Oct. 16, 2015

(86) PCT No.: PCT/IB2015/057976
§ 371 (c)(1),
(2) Date: Apr. 14, 2017

(87) PCT Pub. No.: WO2016/059615
PCT Pub. Date: Apr. 21, 2016

(65) Prior Publication Data
US 2017/0240710 A1 Aug. 24, 2017

Related U.S. Application Data

(60) Provisional application No. 62/064,869, filed on Oct. 16, 2014.

(51) Int. Cl.
*C08G 64/18* (2006.01)
*C08G 77/448* (2006.01)
*C08G 64/24* (2006.01)

(52) U.S. Cl.
CPC ......... *C08G 77/448* (2013.01); *C08G 64/186* (2013.01); *C08G 64/24* (2013.01)

(58) Field of Classification Search
None
See application file for complete search history.

(56) References Cited

U.S. PATENT DOCUMENTS

| | | | |
|---|---|---|---|
| 3,516,968 A | 6/1970 | Moore et al. | |
| 5,616,674 A | 4/1997 | Michel et al. | |
| 6,723,864 B2 | 4/2004 | Silva et al. | |
| 6,870,013 B2 | 3/2005 | Silva et al. | |
| 7,112,644 B2 | 9/2006 | Morishita et al. | |
| 7,244,804 B2 | 7/2007 | Ikeda et al. | |
| 2004/0039145 A1* | 2/2004 | Silva .................. | C08G 64/186 528/25 |
| 2005/0032988 A1 | 2/2005 | Silva et al. | |
| 2007/0238846 A1 | 10/2007 | Davis et al. | |

FOREIGN PATENT DOCUMENTS

| | | | |
|---|---|---|---|
| JP | 3337040 B2 | | 10/2002 |
| JP | 2014080496 | * | 5/2014 |
| WO | 2006068818 A1 | | 6/2006 |
| WO | 2007037888 A1 | | 4/2007 |
| WO | 2013067684 A1 | | 5/2013 |

OTHER PUBLICATIONS

International Search Report for International Application No. PCT/IB2015/057976; International Filing Date: Oct. 16, 2015; dated Jan. 13, 2016; 5 Pages.
Machine Translation JP3337040B2; Date of Publication: Oct. 21, 2002; 18 Pages.
Written Opinion of the International Searching Authority for International Application No. PCT/IB2015/057976; International Filing Date: Oct. 16, 2015; dated Jan. 13, 2016; 5 Pages.

* cited by examiner

*Primary Examiner* — David J Buttner
(74) *Attorney, Agent, or Firm* — Cantor Colburn LLP

(57) ABSTRACT

Polysiloxane-polycarbonates and improved methods for preparing the polysiloxane-polycarbonates are provided. Also provided are blend compositions including the polysiloxane-polycarbonates. The blend compositions can include one or more additional polymers. The blend compositions can include one or more additives. The blend compositions can be used to prepare articles of manufacture.

15 Claims, 1 Drawing Sheet

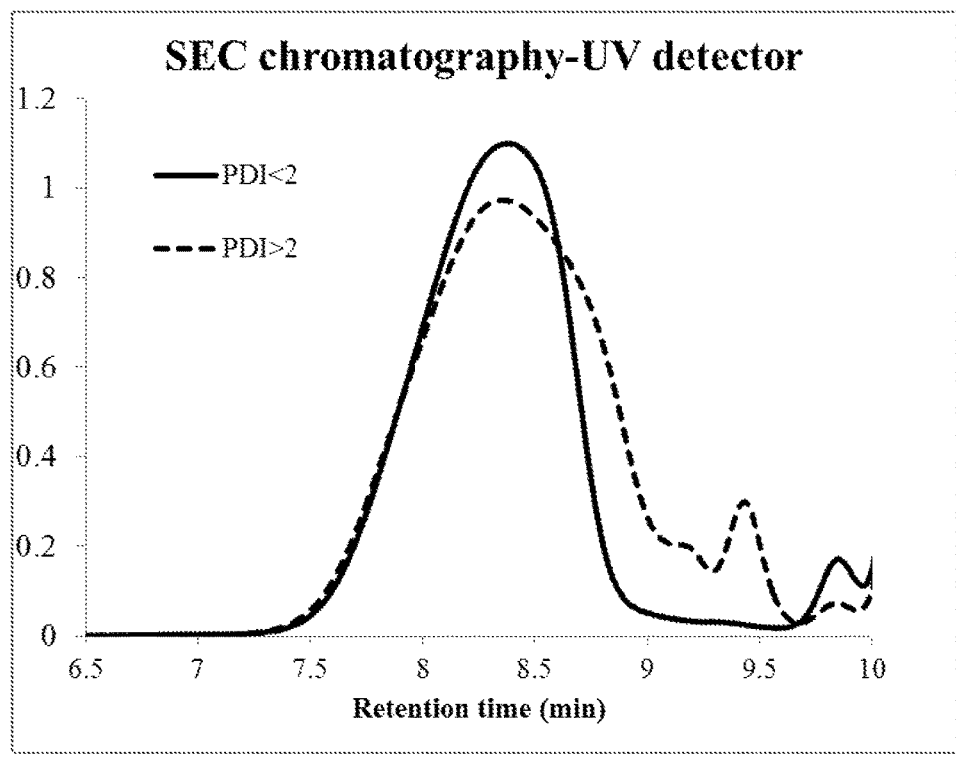

POLYSILOXANE-POLYCARBONATE COPOLYMERS AND METHOD FOR PRODUCTION THEREOF

CROSS REFERENCE TO RELATED APPLICATIONS

This application is a 371 of International Application No. PCT/IB2015/057976, filed Oct. 16, 2015, which claims priority to U.S. Application No. 62/064,869, filed Oct. 16, 2014, both of which are incorporated herein by reference in their entirety.

TECHNICAL FIELD

The present disclosure relates generally to polysiloxane-polycarbonate copolymers and compositions, methods of using the compositions, and processes for preparing the copolymers and compositions.

BACKGROUND

Polysiloxane-polycarbonate copolymers offer superior low-temperature ductility, excellent weatherability, good flame retardance and mold release properties. However, because polycarbonate and siloxane chain segments are not miscible, to meet the need of high clarity, clear polysiloxane-polycarbonate copolymers have been developed by controlling the polymer architecture through interfacial reaction processes, controlling the siloxane content and siloxane chain length, and tailoring the distribution of siloxane segments in the polymer chain.

Despite the understanding of the nature of transparent polysiloxane-polycarbonate copolymers and the cause for opacity, a significant variation in optical resin quality for a given siloxane chain length and siloxane content is often observed. It would be beneficial to design and implement a robust and reproducible method for the production of transparent polysiloxane-polycarbonate copolymers that have excellent optical properties, such as low haze and high transparency.

SUMMARY

In one aspect, disclosed is a method for preparing a polysiloxane-polycarbonate copolymer comprising: (a) contacting a dihydroxyaromatic compound with a continuous supply of phosgene under interfacial reactions conditions, in aqueous-organic solvent at a pH of 9-12, in the presence of at least one tertiary amine, to form a mixture; (b) combining a monohydroxyaromatic compound with the mixture to produce an oligomeric aromatic polycarbonate mixture, with additional introduction of phosgene, wherein the amount of phosgene added in steps (a) and (b) is not more than 60% by weight of the total phosgene employed in the method; (c) combining a mixture of a polyorganosiloxane bis(aryl)chloroformate in aqueous-organic solvent with the oligomeric aromatic polycarbonate mixture, with additional introduction of phosgene, before 65% of the total weight of phosgene is added, to form a reaction mixture; and (d) adding the remainder of the phosgene to the reaction mixture, while stirring, to afford a polysiloxane-polycarbonate copolymer of a desired molecular weight; wherein a molded plaque prepared from the polysiloxane-polycarbonate copolymer has a haze value of less than 3%, as measured according to ASTM D1003-07; wherein the hydroxylaryl terminated polydiorganosiloxane oligomers used to produce the polyorganosiloxane bis(aryl)chloroformate have a polydispersity of less than 3.0.

The compositions, methods, and processes are further described herein.

BRIEF DESCRIPTION OF THE DRAWINGS

FIG. 1 depicts a size exclusion chromatograph detecting the ultraviolet (UV) absorbance signal of eugenol siloxane monomers as they relate to polydispersity.

DETAILED DESCRIPTION

The present disclosure relates to polysiloxane-polycarbonate copolymers, polysiloxane-polycarbonate copolymer compositions, and methods for preparing the copolymers and compositions. The disclosed methods provide polysiloxane-polycarbonate copolymers with enhanced optical properties, namely low haze and high transparency.

Polysiloxane-polycarbonate copolymers are generally prepared by first preparing an oligomeric bisphenol A polycarbonate, in the presence of a tertiary amine; contacting the oligomeric polycarbonate mixture with a polysiloxane bis (aryl)chloroformate, such as the bischloroformate of hydroxyl-terminated eugenol polydimethylsiloxane; and introducing phosgene and/or chain termination agent either continuously or in stages. These interfacial processes produce low haze polysiloxane-polycarbonate copolymers.

The interfacial process disclosed herein produces polysiloxane-polycarbonate copolymers with a percentage haze lower than 1% in a robust and reproducible manner. The method increases the production efficiency by modifying reaction conditions in the presence of eugenol end-capped polydimethylsiloxane oligomers. Reaction parameters such as tube start %, cycle time. % solids, and polydispersity index of the eugenol end-capped polydimethylsiloxane oligomers are modified to enhance the transparency of the polysiloxane-polycarbonate copolymers.

The disclosed methods produce polysiloxane-polycarbonate copolymers and compositions that can be used to manufacture a variety of articles that require high transparency, excellent weatherability, and low temperature ductility.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B . . . , and N" or "at least one of A, B, . . . N, or combinations thereof" are defined in the broadest sense to mean one or more elements selected from the group comprising A, B . . . , and N, that is to say, any combination of one or more of the elements A, B, . . . , or N including any one element alone or in combination with one or more of the other elements which may also include, in combination, additional elements not listed.

The terms "first," "second," "third," and the like, as used herein, do not denote any order, quantity, or importance, but rather are used to distinguish one element from another.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

"Alkyl" as used herein may mean a linear, branched, or cyclic hydrocarbyl group, such as a methyl group, ethyl group, n-propyl group, isopropyl group, n-butyl group, isobutyl group, tert-butyl group, n-pentyl group, isopentyl group, n-hexyl group, isohexyl group, cyclopentyl group, cyclohexyl group, and the like.

"Aryl" as used herein may mean a substituted or unsubstituted aryl radical containing from 6 to 36 ring carbon atoms. Examples of aryl include, but are not limited to, a phenyl group, a bicyclic hydrocarbon fused ring system, or a tricyclic hydrocarbon fused ring system wherein one or more of the rings are a phenyl group.

"Arylalkyl" as used herein may mean an aryl, as defined herein, appended to the parent molecular moiety through an alkyl, as defined herein.

"Copolymer" as used herein may mean a polymer derived from two or more structural unit or monomeric species, as opposed to a homopolymer, which is derived from only one structural unit or monomer.

"$C_3$-$C_6$ cycloalkyl" as used herein may mean cyclopropyl, cyclobutyl, cyclopentyl or cyclohexyl.

"Cycle time" refers to the batch time or total reaction time in the resin reactor.

"D45 polydimethylsiloxane", "D45 siloxane" or "D45 block" refers to the polydiorganosiloxane blocks which comprise the siloxane-containing repeating units of a polysiloxane oligomer or polymer in which there is an average of 45 siloxane repeating units.

"Db*" as used herein refers to a difference in the "b*" value between a sample and a standard reference color along the yellowness-blueness axis, as measured using a spectrophotometer.

"Glass Transition Temperature" or "Tg" as used herein may mean the maximum temperature that a polymer, such as a polycarbonate, will have one or more useful properties. These properties include impact resistance, stiffness, strength, and shape retention. The Tg of a polycarbonate therefore may be an indicator of its useful upper temperature limit, particularly in plastics applications. The Tg may be measured using a differential scanning calorimetry method and expressed in degrees Celsius.

The Tg of a polymer, such as a polycarbonate, may depend primarily on the composition of the polymer. Polycarbonates that are formed from monomers having more rigid and less flexible chemical structures than Bisphenol-A generally have higher Tgs than Bisphenol-A polycarbonate, while polycarbonates that are formed from monomers having less rigid and more flexible chemical structures than Bisphenol-A generally have lower Tgs than Bisphenol-A polycarbonate. For example, a polycarbonate formed from 33 mole % of a rigid monomer, 3,3-bis(4-hydroxyphenyl)-2-phenylisoindolin-1-one ("PPPBP"), and 67 mole % Bisphenol-A has a Tg of 198° C., while a polycarbonate formed from Bisphenol-A, but also having 6 wt % of siloxane units, a flexible monomer, has a Tg of 145° C.

Mixing of two or more polycarbonates having different Tgs may result in a Tg value for the mixture that is intermediate between the Tgs of the polycarbonates that are mixed.

The Tg of a polycarbonate may also be an indicator of the molding or extrusion temperatures required to form polycarbonate parts. The higher the Tg of the polycarbonate the higher the molding or extrusion temperatures that are needed to form polycarbonate parts.

The Tg described herein are measures of heat resistance of, for example, polycarbonate and polycarbonate blends. The Tg can be determined by differential scanning calorimetry. The calorimetry method may use a TA Instruments Q1000 instrument, for example, with setting of 20° C./min ramp rate and 40° C. start temperature and 200° C. end temperature.

"Halo" as used herein may be a substituent to which the prefix is attached is substituted with one or more independently selected halogen radicals. For example, "$C_1$-$C_6$ haloalkyl" means a $C_1$-$C_6$ alkyl substituent wherein one or more hydrogen atoms are replaced with independently selected halogen radicals. Non-limiting examples of $C_1$-$C_6$ haloalkyl include chloromethyl, 1-bromoethyl, fluoromethyl, difluoromethyl, trifluoromethyl, and 1,1,1-trifluoroethyl. It should be recognized that if a substituent is substituted by more than one halogen radical, those halogen radicals may be identical or different (unless otherwise stated).

"Halogen" or "halogen atom" as used herein may mean a fluorine, chlorine, bromine or iodine atom.

"Heteroaryl" as used herein may mean any aromatic heterocyclic ring which may comprise an optionally benzo-condensed 5 or 6 membered heterocycle with from 1 to 3 heteroatoms selected among N, O or S. Non limiting examples of heteroaryl groups may include pyridyl, pyrazinyl, pyrimidinyl, pyridazinyl, indolyl, imidazolyl, thiazolyl, isothiazolyl, pyrrolyl, phenyl-pyrrolyl, furyl, phenyl-furyl, oxazolyl, isoxazotyl, pyrazolyl, thienyl, benzothienyl, isoindolinyl, benzoimidazolyl, quinolinyl, isoquinolinyl, 1,2,3-triazolyl, 1-phenyl-1,2,3-triazolyl, and the like.

"Hindered phenol stabilizer" as used herein may mean 3,5-di-tert-butyl-4-hydroxyhydrocinnamic acid, octadecyl ester.

"Metallized surface" as used herein refers to a surface that is covered with a layer comprising one or more metals.

"PETS release agent" as used herein may mean pentacrythritol tetrastearate, mold release.

"Phosphite stabilizer" as used herein may mean tris-(2,4-di-tert-butylphenyl) phosphite.

"Polycarbonate" as used herein may mean an oligomer or polymer comprising residues of one or more polymer structural units, or monomers, joined by carbonate linkages.

"Polydispersity index" or "PDI" as used herein refers to the ratio of weight average molecular weight ($M_w$) to number average molecular weight ($M_n$). In equation form, PDI=$M_w/M_n$. See FIG. 1.

"Straight or branched $C_1$-$C_3$ alkyl" or "straight or branched $C_1$-$C_3$ alkoxy" as used herein may mean methyl, ethyl, n-propyl, isopropyl, methoxy, ethoxy, n-propoxy and isopropoxy.

Unless otherwise indicated, each of the foregoing groups may be unsubstituted or substituted, provided that the substitution does not significantly adversely affect synthesis, stability, or use of the compound.

The terms "structural unit" and "monomer" are interchangeable as used herein.

"Thermal stability" as used herein refers to resistance of a polymer to molecular weight degradation under thermal conditions. Thus, a polymer with poor thermal stability may show significant molecular weight degradation under thermal conditions, such as during extrusion, molding, thermoforming, hot-pressing, and like conditions. Molecular weight degradation may also be manifest through color formation and/or in the degradation of other properties such as weatherability, gloss, mechanical properties, and/or thermal properties. Molecular weight degradation can also cause significant variation in processing conditions such as melt viscosity changes.

"% Solids" refers to the percentage of product, by weight, in the total organic solvent employed in the reaction for producing the polysiloxane-polycarbonate copolymer.

"Tube start (%)" refers to the point in the reaction cycle which the tubular reactor starts operation based on the percentage of the total phosgene added to the resin reactor. Tube start at 50% means that after 50% of the total phosgene has been added to the resin reactor, the tube will initiate the addition of phosgene and the eugenol siloxane to produce the siloxane bischloroformate. The siloxane bischloroformate is then fed to the resin reactor to react with the oligomeric polycarbonate and produce the polysiloxane-polycarbonate copolymer.

"% Haze" may refer to the measured % haze values for a 3.15 mm molded plaque prepared from a polydimethylsiloxane-polycarbonate block copolymer.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Disclosed are polysiloxane-polycarbonate copolymers. The polysiloxane-polycarbonate copolymers have repeating units of both polycarbonate and polysiloxane structural units.

The polycarbonate structural unit of the polysiloxane-polycarbonate copolymer may have repeating units of formula (1):

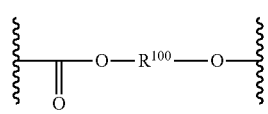

(1)

wherein each $R^{100}$ may independently comprise any suitable organic group, such as an aliphatic, alicyclic, or aromatic group, or any combination thereof. In certain embodiments, $R^{100}$ in the carbonate units of formula (1) may be a $C_6$-$C_{36}$ aromatic group wherein at least one moiety is aromatic.

The repeating units of formula (1) may be derived from dihydroxy compounds of formula (2):

wherein $R^{100}$ is as defined above.

The polycarbonate may include repeating units of formula (3):

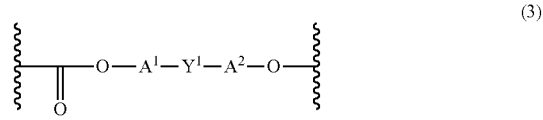

(3)

wherein each of the $A^1$ and $A^2$ is a monocyclic divalent aryl group and $Y^1$ is a bridging group having one or two atoms that separate $A^1$ and $A^2$. For example, one atom may separate $A^1$ from $A^2$, with illustrative examples of these groups including —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecyclidene, cyclododecylidene, and adamantylidene. The bridging group of $Y^1$ may be a hydrocarbon group such as methylene, cyclohexylidene, or isopropylidene.

The repeating units of formula (3) may be derived from a dihydroxy monomer unit of formula (4):

wherein $A^1$, $A^2$, and $Y^1$ are as defined above.

The polycarbonate may include repeating units of formula (5):

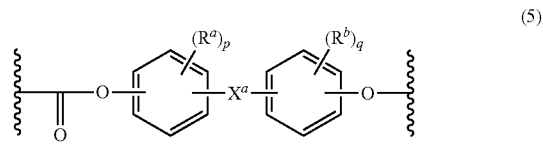

(5)

wherein $R^a$ and $R^b$ are each independently halogen, $C_1$-$C_{12}$ alkyl, $C_1$-$C_{12}$ alkenyl, $C_3$-$C_8$ cycloalkyl, or $C_1$-$C_{12}$ alkoxy; p and q are each independently 0 to 4; and $X^a$ is a bridging group between the two arylene groups. $X^a$ may be a single bond, —O—, —S—, —S(O)—, —S(O)$_2$—, —C(O)—, or a $C_1$-$C_{18}$ organic group. The $C_1$-$C_{18}$ organic bridging group may be cyclic or acyclic, aromatic or non-aromatic, and can optionally include halogens, heteroatoms (e.g., oxygen, nitrogen, sulfur, silicon, or phosphorous), or a combination thereof. The $C_1$-$C_{18}$ organic group can be disposed such that the $C_6$ arylene groups connected thereto are each connected to a common alkylidene carbon or to different carbons of the $C_1$-$C_{18}$ organic bridging group. The bridging group $X^a$ and the carbonate oxygen atoms of each $C_6$ arylene group can be disposed ortho, meta, or para (specifically para) to each other on the $C_6$ arylene group. Exemplary $X^a$ groups include, but are not limited to, methylene, ethylidene, neopentylidene, isopropylidene, cyclohexylmethylidene, 1,1-ethene, 2-[2.2.1]-bicycloheptylidene, cyclohexylidene, cyclopentylidene, cyclododecylidene, and adamantylidene.

In certain embodiments, p and q are each 1; $R^a$ and $R^b$ are each a $C_1$-$C_3$ alkyl group, specifically methyl, disposed meta to the oxygen on each ring; and $X^a$ is isopropylidene. In certain embodiments, p and q are both 0; and $X^a$ is isopropylidene.

In certain embodiments, $X^a$ may have formula (6):

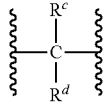
(6)

wherein $R^c$ and $R^d$ are each independently hydrogen, halogen, alkyl (e.g., $C_1$-$C_{12}$ alkyl), cycloalkyl (e.g., $C_3$-$C_{12}$ cycloalkyl), cycloalkylalkyl (e.g., $C_3$-$C_{12}$-cycloalkyl-$C_1$-$C_6$-alkyl), aryl (e.g., $C_6$-$C_{12}$ aryl), arylalkyl (e.g., $C_6$-$C_{12}$-aryl-$C_1$-$C_6$-alkyl), heterocyclyl (e.g., five- or six-membered heterocyclyl having one, two, three, or four heteroatoms independently selected from nitrogen, oxygen, and sulfur), heterocyclylalkyl (e.g., five- or six-membered heterocyclyl-$C_1$-$C_6$-alkyl), heteroaryl (e.g., five- or six-membered heteroaryl having one, two, three, or four heteroatoms independently selected from nitrogen, oxygen, and sulfur), or heteroarylalkyl (e.g., five- or six-membered heteroaryl-$C_1$-$C_6$-alkyl), wherein said alkyl, cycloalkyl, cycloalkylalkyl, aryl, arylalkyl, heterocyclyl, heterocyclylalkyl, heteroaryl, and heteroarylalkyl are each independently unsubstituted or substituted (e.g., substituted with 1 to 3 substituents independently selected from the group consisting of —OH, —NH$_2$, —NO$_2$, —CN, halo, $C_1$-$C_4$-alkyl, $C_1$-$C_4$-alkoxy-$C_1$-$C_4$-alkyl, halo-$C_1$-$C_4$-alkyl, halo-$C_1$-$C_4$-alkoxy-$C_1$-$C_4$-alkyl, hydroxy-$C_1$-$C_4$-alkyl, amino-$C_1$-$C_4$-alkyl, $C_1$-$C_4$-alkylamino-$C_1$-$C_4$-alkyl, di($C_1$-$C_4$-alkyl)amino-$C_1$-$C_4$-alkyl, azido-$C_1$-$C_4$-alkyl, cyano-$C_1$-$C_4$-alkyl, $C_1$-$C_4$-alkoxy, halo-$C_1$-$C_4$-alkoxy, $C_1$-$C_4$-alkoxy-$C_1$-$C_4$-alkoxy, $C_2$-$C_4$-alkenyl, and $C_2$-$C_4$-alkynyl). In certain embodiments, $R^c$ and $R^d$ are each independently hydrogen or $C_1$-$C_8$ alkyl. In certain embodiments, $R^c$ and $R^d$ are each methyl. Exemplary groups of formula (6) include, but are not limited to, methylene, ethylidene, neopentylidene, and isopropylidene.

In certain embodiments, $X^a$ may have formula (7):

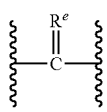
(7)

wherein $R^e$ is a divalent $C_1$-$C_{31}$ group. In certain embodiments, $R^e$ is a divalent hydrocarbyl (e.g., a $C_{12}$-$C_{31}$ hydrocarbyl), a cycloalkylidene (e.g., a $C_5$-$C_{18}$ cycloalkylidene), a cycloalkylene (e.g., a $C_5$-$C_{18}$ cycloalkylene), a heterocycloalkylidene (e.g., a $C_3$-$C_{18}$ heterocycloalkylidene), or a group of the formula —B$^1$-G-B$^2$— wherein B$^1$ and B$^2$ are the same or different alkylene group (e.g., a $C_1$-$C_6$ alkylene group) and G is a cycloalkylidene group (e.g., a $C_3$-$C_{12}$ cycloalkylidene group) or an arylene group (e.g., a $C_6$-$C_{16}$ arylene group), wherein said hydrocarbyl, cycloalkylidene, cycloalkylene, and heterocycloalkylidene are each independently unsubstituted or substituted (e.g., substituted with 1 to 3 substituents independently selected from the group consisting of —OH, —NH$_2$, —NO$_2$, —CN, halo, $C_1$-$C_4$-alkyl, $C_1$-$C_4$-alkoxy-$C_1$-$C_4$-alkyl, halo-$C_1$-$C_4$-alkyl, halo-$C_1$-$C_4$-alkoxy-$C_1$-$C_4$-alkyl, hydroxy-$C_1$-$C_4$-alkyl, amino-$C_1$-$C_4$-alkyl, $C_1$-$C_4$-alkylamino-$C_1$-$C_4$-alkyl, di($C_1$-$C_4$-alkyl)amino-$C_1$-$C_4$-alkyl, azido-$C_1$-$C_4$-alkyl, cyano-$C_1$-$C_4$-alkyl, $C_1$-$C_4$-alkoxy, halo-$C_1$-$C_4$-alkoxy, $C_1$-$C_4$-alkoxy-$C_1$-$C_4$-alkoxy, $C_2$-$C_4$-alkenyl, and $C_2$-$C_4$-alkynyl). Exemplary groups of formula (7) include, but are not limited to, 2-[2.2.1]-bicycloheptylidene, cyclohexylidene, cyclopentylidene, cyclododecylidene, and adamantylidene.

The repeating structural units of formula (5) may be derived from a dihydroxy monomer unit of formula (8):

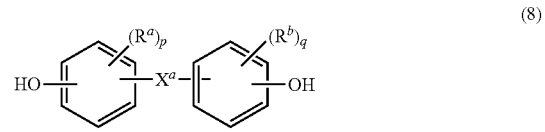
(8)

wherein $X^a$, $R^a$, $R^b$, p, and q are as defined above. In certain embodiments, p and q are both 0, and $X^a$ is isopropylidene.

The polycarbonate may include repeating units of formula (9), formula (10), formula (11), or a combination thereof:

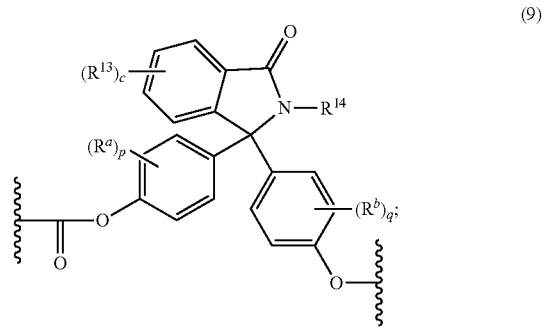
(9)

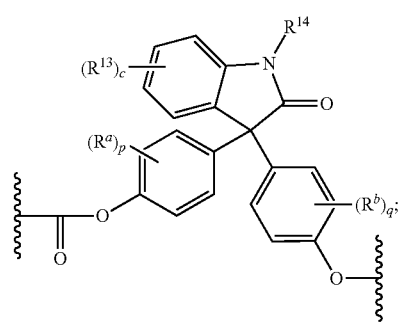
(10)

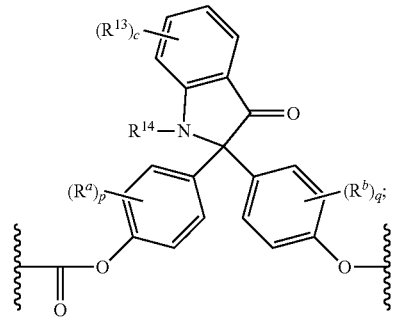
(11)

wherein $R^{13}$ at each occurrence is independently a halogen or a $C_1$-$C_6$ alkyl group; $R^{14}$ is independently a $C_1$-$C_6$ alkyl, phenyl, or phenyl substituted with up to five halogens or $C_1$-$C_6$ alkyl groups; $R^a$ and $R^b$, at each occurrence, are each independently a halogen, $C_1$-$C_{12}$ alkyl, $C_1$-$C_{12}$ alkenyl, $C_3$-$C_8$ cycloalkyl, or $C_1$-$C_{12}$ alkoxy; c is independently 0 to 4; and p and q are each independently 0 to 4. In a specific embodiment, $R^{14}$ is a $C_1$-$C_6$ alkyl or phenyl group. In still another embodiment, $R^{14}$ is a methyl or phenyl group. In another specific embodiment, c is 0; p is 0; and q is 0.

The repeating structural units of formula (9) may be derived from a dihydroxy monomer unit of formula (12); the repeating structural units of formula (10) may be derived from a dihydroxy monomer unit of formula (13); and the repeating structural units of formula (11) may be derived from a dihydroxy monomer unit of formula (14):

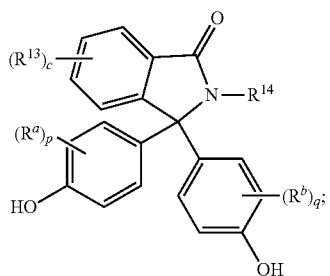
(12)

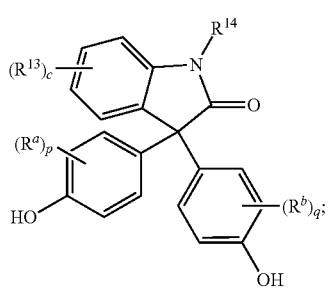
(13)

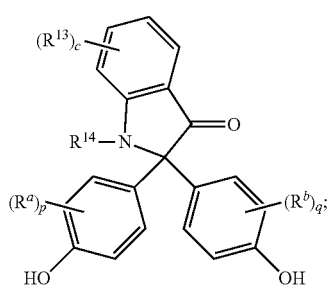
(14)

wherein $R^a$, $R^b$, $R^{13}$, c, p, and q are as defined above. Such dihydroxy compounds can be useful for high heat applications.

The dihydroxy compound of formula (12) can have formula (15), which may be useful for high heat applications:

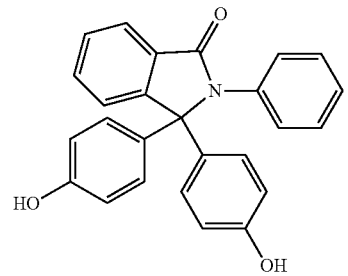
(15)

(also known as 3,3-bis(4-hydroxyphenyl)-2-phenylisoindolin-1-one (PPPBP)).

The polycarbonate may include repeating units of formula (16):

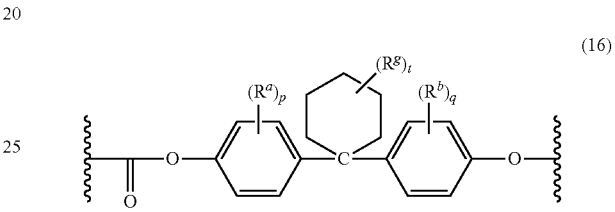
(16)

wherein $R^a$ and $R^b$ are each independently halogen, $C_1$-$C_{12}$ alkyl, $C_1$-$C_{12}$ alkenyl, $C_3$-$C_8$ cycloalkyl, or $C_1$-$C_{12}$ alkoxy; $R^g$ is independently $C_1$-$C_{12}$ alkyl or halogen, or two $R^g$ groups together with the carbon atoms to which they are attached may form a four-, five-, or six-membered cycloalkyl group; p and q are each independently 0 to 4; and t is 0 to 10, $R^a$ and $R^b$ may be disposed meta to the cyclohexylidene bridging group. The substituents $R^a$, $R^b$ and $R^g$ may, when comprising an appropriate number of carbon atoms, be straight chain, cyclic, bicyclic, branched, saturated, or unsaturated. In one example, $R^a$, $R^b$ and $R^g$ are each independently $C_1$-$C_4$ alkyl, p and q are each 0 or 1, and t is 0 to 5. In another example, $R^a$, $R^b$ and $R^g$ are each methyl, p and q are each 0 or 1, and t is 0 or 3. The cyclohexylidene-bridged bisphenol can be the reaction product of two moles of o-cresol with one mole of cyclohexanone. In another example, the cyclohexylidene-bridged bisphenol may be the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high Tgs and high heat distortion temperatures. Cyclohexyl bisphenol-containing polycarbonates, or a combination comprising at least one of the foregoing with other bisphenol polycarbonates, are supplied by Bayer Co. under the APEC® trade name.

The repeating structural units of formula (16) may be derived from a dihydroxy monomer unit of formula (17):

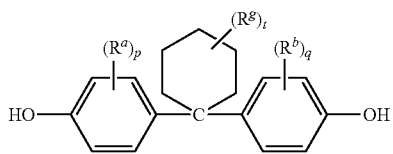

(17)

wherein $R^a$, $R^b$, $R^g$, p, q, and t are as defined above.

The dihydroxy compound of formula (17) can have formula (18), which may be useful for high heat applications:

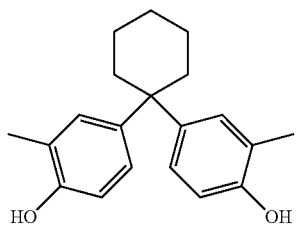

(18)

(also known as 1,1-bis(4-hydroxy-3-methylphenyl)cyclohexane (DMBPC)).

The dihydroxy compound of formula (17) can have formula (19), which may be useful for high heat applications:

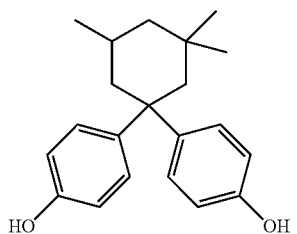

(19)

(also known as bisphenol isophorone).

The dihydroxy compound of formula (17) can have formula (20), which may be useful for high heat applications:

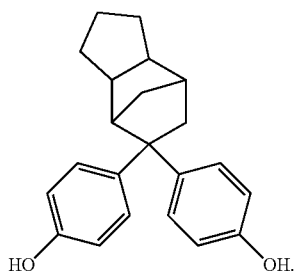

(20)

The polycarbonate may include repeating units of formula (21):

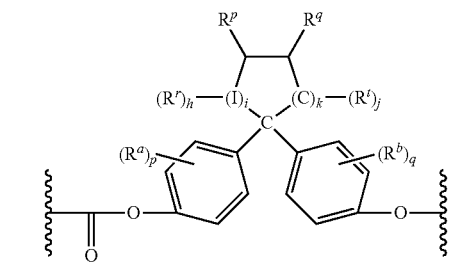

(21)

wherein $R^r$, $R^p$, $R^q$ and $R^t$ are each independently hydrogen, halogen, oxygen, or a $C_1$-$C_{12}$ organic group; $R^a$ and $R^b$ are each independently halogen, $C_1$-$C_{12}$ alkyl, $C_1$-$C_{12}$ alkenyl, $C_3$-$C_8$ cycloalkyl, or $C_1$-$C_{12}$ alkoxy; I is a direct bond, a carbon, or a divalent oxygen, sulfur, or —N(Z)— where Z is hydrogen, halogen, hydroxy, $C_1$-$C_{12}$ alkyl, $C_1$-$C_{12}$ alkoxy, $C_6$-$C_{12}$ aryl, or $C_1$-$C_{12}$ acyl; h is 0 to 2, j is 1 or 2, i is an integer of 0 or 1, k is an integer of 0 to 3, p is an integer of 0 to 4, and q is an integer 0 to 4, with the proviso that at least two of $R^r$, $R^p$, $R^q$ and $R^t$ taken together are a fused cycloaliphatic, aromatic, or heteroaromatic ring. It will be understood that where the fused ring is aromatic, the ring as shown in formula (21) will have an unsaturated carbon-carbon linkage where the ring is fused. When i is 0, h is 0, and k is 1, the ring as shown in formula (21) contains 4 carbon atoms; when i is 0, h is 0, and k is 2, the ring as shown contains 5 carbon atoms, and when i is 0, h is 0, and k is 3, the ring contains 6 carbon atoms. In one example, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

The repeating structural units of formula (21) may be derived from a dihydroxy monomer unit of formula (22):

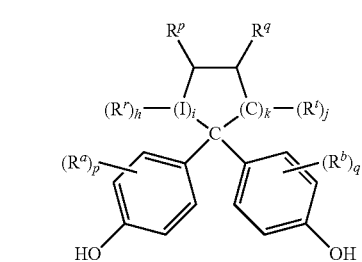

(22)

wherein $R^a$, $R^b$, $R^r$, $R^p$, $R^q$, $R^t$, I, h, i, j, k, p, and q are as defined above.

The polycarbonate may include repeating units of formula (23):

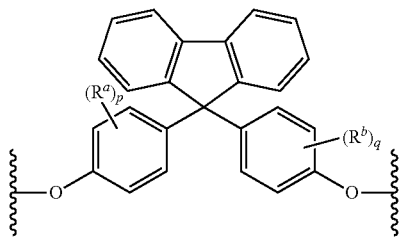

(23)

wherein $R^a$ and $R^b$ are each independently halogen, $C_1$-$C_{12}$ alkyl, $C_1$-$C_{12}$ alkenyl, $C_3$-$C_8$ cycloalkyl, or $C_1$-$C_{12}$ alkoxy; and p and q are each independently 0 to 4. In certain embodiments, at least one of each of $R^a$ and $R^b$ are disposed meta to the cycloalkylidene bridging group. In certain embodiments, $R^a$ and $R^b$ are each independently $C_1$-$C_3$ alkyl; and p and q are each 0 or 1. In certain embodiments, $R^a$ and $R^b$ are each methyl; and p and q are each 0 or 1.

The repeating structural units of formula (23) may be derived from a dihydroxy monomer unit of formula (24):

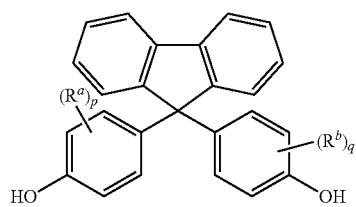

(24)

wherein $R^a$, $R^b$, p, and q are as defined above. Such dihydroxy compounds that might impart high Tgs to the polycarbonate as a copolycarbonate are described in U.S. Pat. No. 7,244,804, which is fully incorporated herein by reference.

The dihydroxy compound of formula (24) can have formula (25), which may be useful for high heat applications:

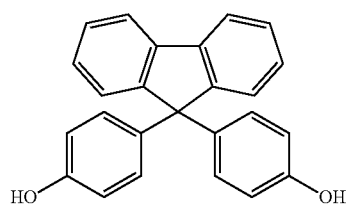

(25)

(also known as 9,9-bis(4-hydroxyphenyl)fluorene).

The polycarbonate may include repeating units of formula (26):

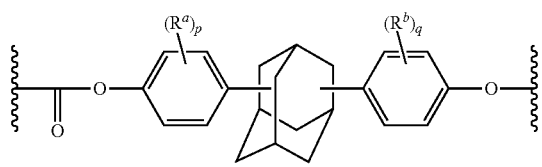

(26)

wherein $R^a$ and $R^b$ are each independently halogen, $C_1$-$C_{12}$ alkyl, $C_1$-$C_{12}$ alkenyl, $C_3$-$C_8$ cycloalkyl, or $C_1$-$C_{12}$ alkoxy; and p and q are each independently 0 to 4. In certain embodiments, at least one of each of $R^a$ and $R^b$ are disposed meta to the cycloalkylidene bridging group. In certain embodiments, $R^a$ and $R^b$ are each independently $C_1$-$C_3$ alkyl; and p and q are each 0 or 1. In certain embodiments, $R^a$ and $R^b$ are each methyl; and p and q are each 0 or 1.

The repeating structural units of formula (26) may be derived from a dihydroxy monomer unit of formula (27):

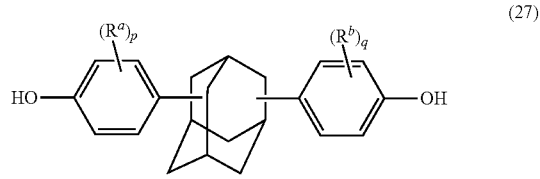

(27)

wherein $R^a$, $R^b$, p, and q are as defined above. Such dihydroxy compounds that might impart high Tgs to the polycarbonate are described in U.S. Pat. Nos. 7,112,644 and 3,516,968, which are fully incorporated herein by reference.

The dihydroxy compound of formula (27) can have formula (28), which may be useful for high heat applications:

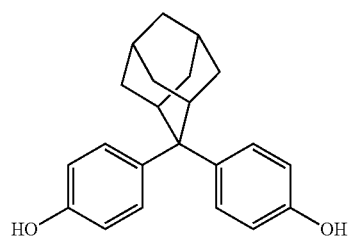

(28)

(also known as 2,2-bis(4-hydroxyphenyl)adamantane).

A dihydroxy compound of formula 29) may be useful for high heat applications:

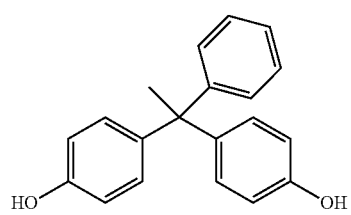

(29)

(also known as 4,4'-(1-phenylethane-1,1-diyl)diphenol (bisphenol-AP) or 1,1-bis(4-hydroxyphenyl)-1-phenyl-ethane).

A dihydroxy compound of formula (30) may be useful for high heat applications:

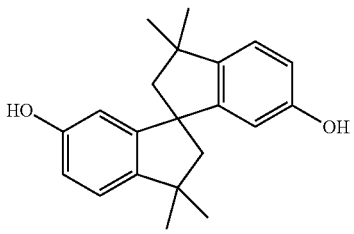

(30)

(also known as 6,6'-dihydroxy-3,3,3',3'-tetramethylspiro(bis)indane).

A dihydroxy compound of formula (31) may be useful for high heat applications:

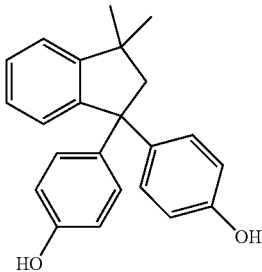

(31)

(also known as 4,4'-(3,3-dimethyl-2,2-dihydro-1H-indene-1,1-diyl)diphenol).

Exemplary monomers for inclusion in the polycarbonate include, but are not limited to, 4,4'-dihydroxybiphenyl, 1,1-bis(4-hydroxyphenyl)methane, bis(4-hydroxyphenyl)acetonitrile, bis(4-hydroxyphenyl)phenylmethane, bis(4-hydroxyphenyl)-1-naphthylmethane, 1,1-bis(4-hydroxyphenyl)ethane, 1,2-bis(4-hydroxyphenyl)ethane, 1,1-bis(4-hydroxyphenyl)-1-phenylethane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 1,1-bis(4-hydroxyphenyl)propane, 1,1-bis(4-hydroxy-t-butylphenyl)propane, 2,2-bis(4-hydroxyphenyl)propane ("bisphenol-A" or "BPA"), 2-(4-hydroxyphenyl)-2-(3-hydroxyphenyl)propane, 2,2-bis(4-hydroxy-2-methylphenyl)propane, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxy-3-bromophenyl)propane, 2,2-bis(4-hydroxyphenyl)hexafluoropropane, 1,1-bis(4-hydroxyphenyl)n-butane, 2,2-bis(4-hydroxyphenyl)butane, 3,3-bis(4-hydroxyphenyl)-2-butanone, 1,1-bis(4-hydroxyphenyl)isobutene, trans-2,3-bis(4-hydroxyphenyl)-2-butene, 1,6-bis(4-hydroxyphenyl)-1,6-hexanedione, 2,2-bis(4-hydroxyphenyl)octane, 1,1-bis(hydroxyphenyl)cyclopentane, 1,1-bis(4-hydroxyphenyl)cyclohexane, 1,1-bis(4-hydroxy-3-methylphenyl)cyclohexane, 1,1-bis(4-hydroxyphenyl)cyclododecane, 2,2-bis(4-hydroxyphenyl)adamantane, (alpha, alpha'-bis(4-hydroxyphenyl)toluene, 4,4'-dihydroxybenzophenone, 2,7-dihydroxypyrene, bis(4-hydroxyphenyl)ether, ethylene glycol bis(4-hydroxyphenyl)ether, bis(4-hydroxyphenyl)sulfide, bis(4-hydroxyphenyl)sulfoxide, bis(4-hydroxyphenyl)sulfone, bis(4-hydroxyphenyl)diphenylmethane, 1,6-dihydroxynaphthalene, 2,6-dihydroxynaphthalene, 6,6'-dihydroxy-3,3,3',3'-tetramethylspiro(bis)indane ("spirobiindane bisphenol"), 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole, 2-phenyl-3,3-bis(4-hydroxyphenyl)phthalimidine (also referred to as 3,3-bis(4-hydroxyphenyl)-2-phenylisoindolin-1-one or "PPPBP"), 9,9-bis(4-hydroxyphenyl)fluorene, and bisphenol isophorone (also referred to as 4,4'-(3,3,5-trimethylcyclohexane-1,1-diyl)diphenol or "BPI"), 1,1-bis(4-hydroxy-3-methylphenyl)cyclohexane ("DMBPC"), tricyclopentadienyl bisphenol (also referred to as 4,4'-(octahydro-1H-4,7-methanoindene-5,5-diyl)diphenol), 2,2-bis(4-hydroxyphenyl)adamantane ("BCF"), 1,1-bis(4-hydroxyphenyl)-1-phenyl ethane ("BPAP"), and 3,3-bis(4-hydroxyphenyl)phthalide, or any combination thereof.

Exemplary monomers useful for increasing the Tg of the polycarbonate include, but are not limited to, bis(4-hydroxyphenyl)diphenylmethane, 1,6-dihydroxynaphthalene, 2,6-dihydroxynaphthalene, 6,6'-dihydroxy-3,3,3',3'-tetramethylspiro(bis)indane ("spirobiindane bisphenol"), 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole. PPPBP, 9,9-bis(4-hydroxyphenyl)fluorene, BPI, DMBPC, tricyclopentadienyl bisphenol (also referred to as 4,4'-(octahydro-1H-4,7-methanoindene-5,5-diyl)diphenol), BCF, BPAP, and 3,3-bis(4-hydroxyphenyl)phthalide, or any combination thereof.

Other dihydroxy monomer units that may be used include aromatic dihydroxy compounds of formula (32):

(32)

wherein each $R^h$ is independently a halogen atom, a $C_1$-$C_{10}$ hydrocarbyl such as a $C_1$-$C_{10}$ alkyl group, or a halogen substituted $C_1$-$C_{10}$ hydrocarbyl such as a halogen-substituted $C_1$-$C_{10}$ alkyl group, and n is 0 to 4. The halogen, when present, is usually bromine.

Examples of aromatic dihydroxy compounds represented by formula (31) include, but are not limited to, resorcinol, substituted resorcinol compounds (e.g., 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol), catechol, hydroquinone, substituted hydroquinones (e.g., 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations thereof.

The polysiloxane structural units of the polysiloxane-polycarbonate copolymer may have repeating units of formula (33):

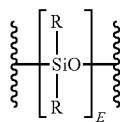
(33)

wherein each R is independently a $C_1$-$C_{13}$ monovalent organic group. For example, R can be a $C_1$-$C_{13}$ alkyl, $C_1$-$C_{13}$ alkoxy, $C_2$-$C_{13}$ alkenyl, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. Where a transparent poly(carbonate-siloxane) is desired, R is unsubstituted by halogen. Combinations of the foregoing R groups can be used in the same copolymer.

The value of E in formula (33) can vary widely depending on the type and relative amount of each component in the composition, the desired properties of the composition, and like considerations. Generally, E has an average value of 1 to 1.000, specifically 2 to 500, 2 to 200, 10 to 200, 2 to 125.5 to 80, 10 to 100, 10 to 70, 30 to 60, or 40 to 50, E may have an average value of 10 to 100, 10 to 80, 10 to 40, 40 to 80, 30 to 60, 40 to 70, or 40 to 50. Where E is of a lower value (e.g., less than 40), it can be desirable to use a relatively larger amount of the poly(carbonate-siloxane). Conversely, where E is of a higher value (e.g., greater than 40), a relatively lower amount of the poly(carbonate-siloxane) can be used. A combination of a first and a second (or more) poly(carbonate-siloxane) can be used, wherein the average value of E of the first copolymer is less than the average value of E of the second copolymer.

The polysiloxane blocks may be provided by repeating structural units of formula (34):

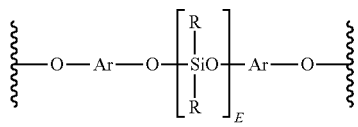
(34)

wherein E and R are as defined in formula (33), and each Ar is independently a substituted or unsubstituted $C_6$-$C_{30}$ arylene wherein the bonds are directly connected to an aromatic moiety. The Ar groups in formula (34) can be derived from a $C_6$-$C_{30}$ dihydroxyarylene compound, for example a dihydroxyarylene compound of formula (2), (4), or (8) above. Specific dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxyarylene compounds can also be used.

Polysiloxane comprising units of formula (34) can be derived from the corresponding dihydroxy compound of formula (35):

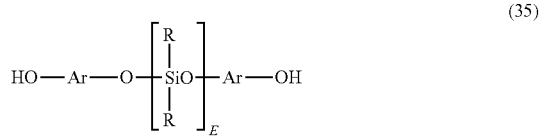
(35)

wherein Ar, R, and E are as described above. Compounds of formula (35) can be obtained by the reaction of a dihydroxyaromatic compound with, for example, an alpha, omega-bis-acetoxy-polydiorganosiloxane oligomer under phase transfer conditions. Compounds of formula (35) can also be obtained from the condensation product of a dihydroxyaromatic compound, with, for example, an alpha, omega bis-chloro-polydimethylsiloxane oligomer in the presence of an acid scavenger.

In a specific embodiment, where Ar of formula (35) is derived from resorcinol, the dihydroxy aromatic compound has formula (36):

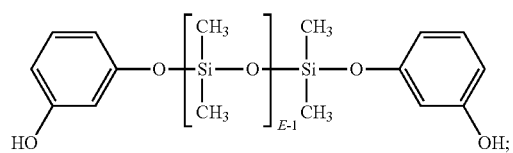
(36)

or, wherein Ar is derived from bisphenol-A, and the dihydroxy aromatic compound has formula (37):

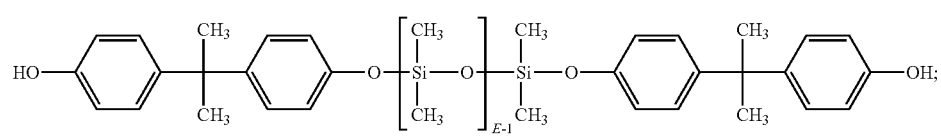
(37)

wherein E has an average value of between 20 and 75.

The polydiorganosiloxane blocks may have formula (38):

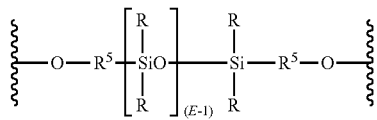
(38)

wherein R and E are as described in formula (33), and each $R^5$ is independently a divalent $C_1$-$C_{30}$ organic group such as a $C_1$-$C_{30}$ alkyl, $C_1$-$C_{30}$ aryl, or $C_1$-$C_{30}$ alkylaryl.

The polysiloxane blocks of formula (38) may be derived from the corresponding dihydroxy compound of formula (39):

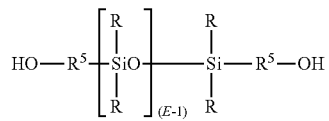
(39)

wherein R and E and $R^5$ are as described for formula (38).

In a specific embodiment, the polysiloxane blocks are of formula (40):

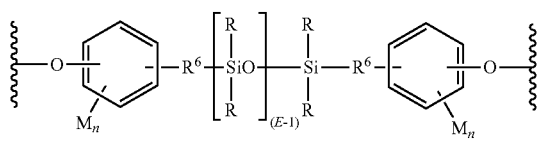
(40)

wherein R and E are as defined in formula (33), $R^6$ is a divalent $C_2$-$C_8$ aliphatic group, each M is independently a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, and each n is independently 0, 1, 2, 3, or 4. In an embodiment, M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, each R is methyl, each $R^6$ is a divalent $C_1$-$C_3$ aliphatic group, each M is methoxy, and each n is one.

Specific polysiloxane blocks are of formulas (40a)-(40c):

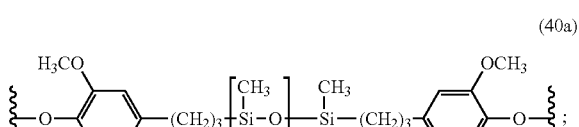
(40a)

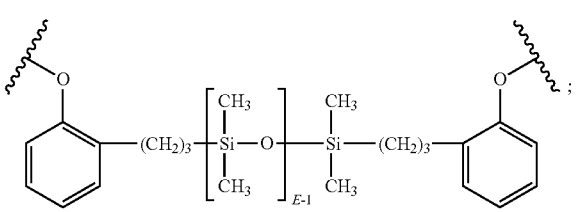
(40b)

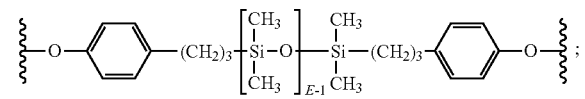
(40c)

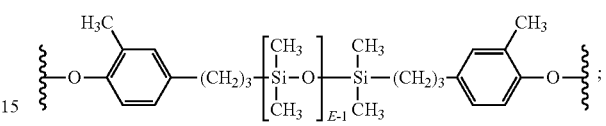
(40d)

or a combination comprising at least one of the foregoing can be used, wherein E has an average value of 1 to 1000, 2 to 200, 10 to 200, 2 to 125, 5 to 125, 1 to 100, 5 to 100, 10 to 100, 5 to 50, 20 to 80, 30 to 60, 40 to 50, or 5 to 20. In a preferred embodiment, the polysiloxane blocks are of the formula (40a).

Polysiloxane blocks of formula (40) can be derived from the corresponding dihydroxy polysiloxane of formula (41):

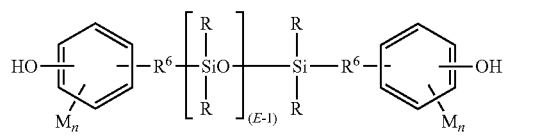
(41)

wherein each of R, E, M, $R^6$, and n are as described for formula (40). Such dihydroxy polysiloxanes can be made by affecting a platinum-catalyzed addition between a siloxane hydride and an aliphatically unsaturated monohydric phenol. The polysiloxane hydride may have formula (42):

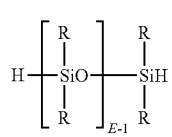
(42)

wherein R and E are as previously for formula (40). Exemplary aliphatically unsaturated monohydric phenols include, for example, eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol.

Still other polysiloxane blocks are of formula (43)

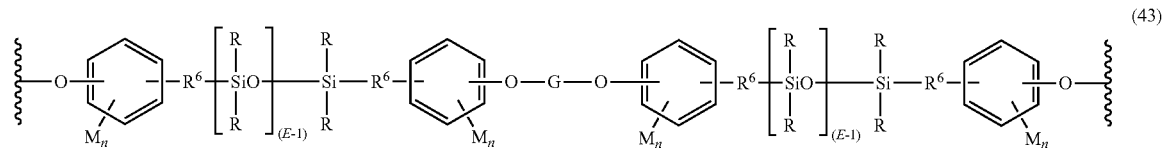

wherein R, E, $R^6$, M, and n are as defined in formula (40), and G is a linking group, for example a group of the formula —C(=O)$Ar^1$C(=O)— wherein $Ar^1$ is a substituted or unsubstituted $C_6$-$C_{30}$ arylene, for example phenylene; a group of the formula —C(=O)NH$Ar^2$NHC(=O)— wherein $Ar^2$ is a substituted or unsubstituted $C_6$-$C_{30}$ arylene or a group of the formula —$Ar^{2a}X^aAr^{2a}$— wherein each $Ar^{2a}$ is independently a substituted or unsubstituted $C_6$-$C_{12}$ arylene and $X^a$ is a single bond, —O—, —S—, —S(O)—, —S(O)$_2$—, —C(O)—, or a $C_1$-$C_{18}$ organic group bridging group connecting the two arylene groups, for example, a substituted or unsubstituted $C_1$-$C_{25}$ alkylidene of the formula —C($R^c$)($R^d$)— wherein $R^c$ and $R^d$ are each independently hydrogen, $C_1$-$C_{12}$ alkyl, $C_1$-$C_{12}$ cycloalkyl, $C_7$-$C_{12}$ arylalkyl, for example methylene, where the bridging group and the hydroxy substituent of each $C_6$ arylene group are disposed ortho, meta, or para (specifically para) to each other on the $C_6$ arylene group; or a group of the formula —P(=O)$Ar^3$— wherein $Ar^3$ is a substituted or unsubstituted $C_6$-$C_{30}$ arylene, for example phenylene.

The polysiloxane block may have a polydispersity of less than 5, less than 4.5, less than 4, less than 3.5, less than 3, less than 2.9, less than 2.8, less than 2.7, less than 2.6, less than 2.5, less than 2.4, less than 2.3, less than 2.2, less than 2.1, less than 2, less than 1.9, less than 1.8, less than 1.7, less than 1.6, less than 1.5, less than 1.4, less than 1.3, less than 1.2, less than 1.1, or 1.0. The polysiloxane block may have a polydispersity of 5, 4.5, 4, 3.5, 3, 2.9, 2.8, 2.7, 2.6, 2.5, 2.4, 2.3, 2.2, 2.1, 2, 1.9, 1.8, 1.7, 1.6, 1.5, 1.4, 1.3, 1.2, 1.1, or 1.

The polysiloxane-polycarbonate copolymers may comprise carbonate units of formula (1) derived from bisphenol A, and polysiloxane units as described above, in particular polysiloxane units of formulas (40a), (40b), (40c), or a combination comprising at least one of the foregoing (specifically of formula 40a), wherein E has an average value of 1 to 1000, specifically 10 to 100, more specifically 30 to 60, more specifically 40 to 60, and still more specifically 40 to 50. The polysiloxane-polycarbonate copolymer can comprise the siloxane units in an amount of 0.1 to 60 weight percent (wt %), 0.5 to 55 wt %, 0.5 to 45 wt %, 0.5 to 30 wt %, or 0.5 to 20 wt %, based on the total weight of the polycarbonate copolymer, with the proviso that the siloxane units are covalently bound to the polymer backbone of the polycarbonate copolymer.

In certain embodiments, the polysiloxane-polycarbonate copolymers are of formula (44):

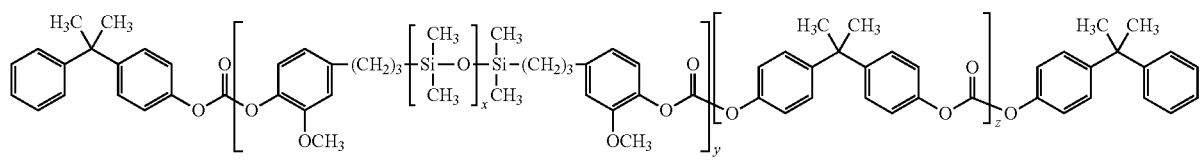

wherein x is 1 to 1000, 1 to 200, 20 to 200, 10 to 200, specifically 5 to 85, specifically 10 to 70, specifically 15 to 65, 30 to 60, and more specifically 40 to 50; y is 1 to 500, or 10 to 200, and z is 1 to 1000, or 10 to 800. In certain embodiments, x is 1 to 200, y is 1 to 90 and z is 1 to 600, and in other embodiments, x is 30 to 50, y is 10 to 30 and z is 45 to 600. The polysiloxane blocks may be randomly distributed or controlled distributed among the polycarbonate blocks.

The polysiloxane-polycarbonate copolymer, such as a polydimethylsiloxane-polycarbonate copolymer, may include 1 wt % to 35 wt % siloxane content (e.g., polydimethylsiloxane content), 1 wt % to 30 wt % siloxane content, 2 wt % to 30 wt % siloxane content, 1 wt % to 25 wt % siloxane content, 5 wt % to 25 wt % siloxane content, 6 wt % to 20 wt % siloxane content, or 3 wt % to 8 wt % siloxane content. The polysiloxane-polycarbonate copolymer, such as a polydimethylsiloxane-polycarbonate copolymer, may include 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, or 35 wt % siloxane content. The polysiloxane-polycarbonate copolymer may include 6 wt % siloxane content. The polysiloxane-polycarbonate copolymer may include 20 wt % siloxane content. Siloxane content may refer to polydimethylsiloxane content.

The polysiloxane-polycarbonate copolymer may have a Mw of 17.000 g/mol to 40.000 g/mol, 18,000 g/mol to 40,000 g/mol, 17,000 g/mol to 35,000 g/mol, 20.000 g/mol to 35,000 g/mol, 23.000 g/mol to 30,000 g/mol, or 22,000 g/mol to 24.000 g/mol. The polysiloxane-polycarbonate copolymer may have a Mw of 17.000 g/mol, 17,500 g/mol, 18.000 g/mol, 18,500 g/mol, 19,000 g/mol, 19,500 g/mol, 20,000 g/mol, 20.500 g/mol, 21,000 g/mol, 21.500 g/mol, 22,000 g/mol, 22.500 g/mol, 23,000 g/mol, 23.500 g/mol, 24,000 g/mol, 24,500 g/mol, 25,000 g/mol, 25,500 g/mol, 26,000 g/mol, 26,500 g/mol, 27,000 g/mol, 27.500 g/mol, 28,000 g/mol, 28.500 g/mol, 29,000 g/mol, 29.500 g/mol, 30,000 g/mol, 30.500 g/mol, 31,000 g/mol, 31.500 g/mol, 32,000 g/mol, 32.500 g/mol, 33,000 g/mol, 33.500 g/mol, 34,000 g/mol, 34,500 g/mol, 35,000 g/mol, 35.500 g/mol, 36,000 g/mol, 36.500 g/mol, 37,000 g/mol, 37.500 g/mol, 38,000 g/mol, 38.500 g/mol, 39,000 g/mol, 39.500 g/mol, or 40,000 g/mol. The polysiloxane-polycarbonate copolymer may have a Mw of 23,000 g/mol, or 30,000 g/mol. Mw is determined by gel permeation chromatography (GPC) using BPA polycarbonate standards.

The polysiloxane-polycarbonate copolymer may have a polysiloxane average block length of 1 to 1000 units. The polysiloxane-polycarbonate copolymer may have a polysiloxane average block length of 10 to 200 units. The polysiloxane-polycarbonate copolymer may have a polysiloxane average block length of 10 to 100 units. The polysiloxane-polycarbonate copolymer may have a polysiloxane average block length of 30 to 100 units. The polysiloxane-polycarbonate copolymer may have a polysiloxane average block length of 30 to 60 units. The polysiloxane-polycarbonate copolymer may have a polysiloxane average block length of 40 to 60 units. The polysiloxane-polycarbonate copolymer may have a polysiloxane average block length of 40 to 50 units. The polysiloxane-polycarbonate copolymer may have a polysiloxane average block length of 45 units.

While the disclosed polysiloxane-polycarbonate copolymers are by their very nature block copolymers, in which organosiloxane blocks alternate with carbonate blocks, it is preferred from the standpoint of transparency for the distribution of organosiloxane blocks to be as random as possible. The disclosed methods are advantageous in affording polysiloxane-polycarbonate copolymers that have a significant degree of randomness.

The polysiloxane-polycarbonate copolymer may have a polydispersity of less than 5, less than 4.5, less than 4, less than 3.5, less than 3, less than 2.9, less than 2.8, less than 2.7, less than 2.6, less than 2.5, less than 2.4, less than 2.3, less than 2.2, less than 2.1, less than 2, less than 1.9, less than 1.8, less than 1.7, less than 1.6, less than 1.5, less than 1.4, less than 1.3, less than 1.2, less than 1.1, or 1.0. The polysiloxane-polycarbonate copolymer may have a polydispersity of 5, 4.5, 4, 3.5, 3, 2.9, 2.8, 2.7, 2.6, 2.5, 2.4, 2.3, 2.2, 2.1, 2, 1.9, 1.8, 1.7, 1.6, 1.5, 1.4, 1.3, 1.2, 1.1, or 1.

Percent haze is an objective property that correlates with the subject property of optical clarity. Unless clearly specified to the contrary, as use herein, haze measurements are determined on 3.18 mm thick injection molded plaques (e.g., having dimensions of 152.4 millimeters (mm) long by 63.5 mm wide by 3.18 mm thick) following ASTM Test Method D1003-07 using Procedure A and Illuminant C on a BKY Gardner Haze-guard Plus haze meter.

The polysiloxane-polycarbonate copolymers may have a haze value of less than or equal to 10%, less than or equal to 9%, less than or equal to 8%, less than or equal to 7%, less than or equal to 6%, less than or equal to 5%, less than or equal to 4%, less than or equal to 3%, less than or equal to 2%, or less than or equal to 1%. The polysiloxane-polycarbonate copolymers may have a haze value of less than 10%, less than 9%, less than 8%, less than 7%, less than 6%, less than 5%, less than 4%, less than 3%, less than 2%, or less than 1%, as measured according to ASTM D1003-07.

Yellowness Index (YI) for laboratory scale samples may be determined using a Hunter Lab Color System. Yellowness Index (YI) may be measured according to ASTM D1925-70 on plaques of 3 mm thickness and on films of 0.2 mm thickness. Films can be prepared in a petri dish by casting from a solution of 1.1 grams of a polycarbonate in 10 mL of chloroform. A molded sample of the polysiloxane-polycarbonate copolymer may have a yellow index less than or equal to 15, less than or equal to 14, less than or equal to 13, less than or equal to 12, less than or equal to 11, less than or equal to 10, less than or equal to 9, less than or equal to 8, less than or equal to 7, less than or equal to 6, less than or equal to 5, less than or equal to 4, less than or equal to 3.5, less than or equal to 3, less than or equal to 2, less than or equal to 1, or 0, as measured according to ASTM D1925-70.

Db* values may be obtained using a spectrophotometer, using standard reference values for L*, a*, and b*. A Macbeth COLOR-EYE™ 7000A reference spectrophotometer may be used for the measurements. Measurements may be performed on rectangular injection molded plaques having dimensions of 6"L×2.5"W×0.125"T following ASTM Test Method D2244-09b. A molded sample of the polysiloxane-polycarbonate copolymer may have a Db* of less than 5, less than 4.5, less than 4.0, less than 3.9, less than 3.8, less than 3.7, less than 3.6, less than 3.5, less than 3.4, less than 3.3, less than 3.2, less than 3.1, less than 3.0, less than 2.9, less than 2.8, less than 2.7, less than 2.6, less than 2.5, less than 2.4, less than 2.3, less than 2.2, less than 2.1, less than 2.0, less than 1.9, less than 1.8, less than 1.7, less than 1.6, less than 1.5, less than 1.4, less than 1.3, less than 1.2, less than 1.1, or less than 1.0, as measured according to ASTM D2244-09b.

Disclosed are methods to prepare polysiloxane-polycarbonate copolymer.

One of the reagents employed in the disclosed methods is an oligomeric aromatic polycarbonate. The structural units in said oligomeric polycarbonate may all have the same structure or may have differing structures; e.g., the oligomeric polycarbonate may be a copolycarbonate. The structural units of the oligomeric polycarbonate may comprise carbonate units of formula (1) derived from bisphenol A, but it should be understood that other dihydroxyaromatic compounds shown above may be substituted for all or part of the bisphenol when appropriate.

Oligomeric polycarbonates may be prepared by any known method for polycarbonate preparation. Included are interfacial, transesterification and redistribution methods. One often preferred method comprises contacting at least one dihydroxyaromatic compound with phosgene, the molar ratio of phosgene to dihydroxyaromatic compound being in the range of 0.1-0.9:1, preferably 0.3-0.85:1 and most preferably 0.5-0.8:1, in an alkaline mixed aqueous-organic liquid at a pH in the range of 9-11, in the presence of at least one trialkylamine as the only catalytic species present and, optionally, at least one monohydroxyaromatic compound or chloroformate thereof as chain termination agent. This method is the first step in an alternative embodiment of the disclosure.

Illustrative organic liquids which may be used in oligomer preparation are aliphatic hydrocarbons such as n-hexane and n-heptane; chlorinated aliphatic hydrocarbons such as methylene chloride, chloroform, carbon tetrachloride, dichloroethane, trichloroethane, tetrachloroethane, dichloropropane and 1,2-dichloroethylene; aromatic hydrocarbons such as benzene, toluene and xylene; substituted aromatic hydrocarbons such as chlorobenzene, o-dichlorobenzene, the chlorotoluene, nitrobenzene and acetophenone; and carbon disulfide. The chlorinated aliphatic hydrocarbons, especially methylene chloride, are preferred.

The catalyst is a tertiary amine, typically a trialkylamine or a highly nucleophilic heterocyclic amine such as 4-dimethylaminomorpholine. Tertiary amine mixtures may also be employed. Among tertiary amines that can be used are aliphatic tertiary amines such as triethylamine, tributylamine, cycloaliphatic amines such as N,N-diethyl-cyclohexylamine and aromatic tertiary amines such as N,N-dimethylaniline. Triethylamine is preferred.

The oligomer-forming reaction is generally conducted at a temperature in the range of 15-50° C. The pH of the aqueous phase of the reaction mixture is maintained in the range of 9-12 by introduction of a suitable base, most often an alkali metal hydroxide and preferably sodium hydroxide.

A monohydroxyaromatic compound or chloroformate thereof may be present as a chain termination agent in the oligomer preparation method. Illustrative chain termination agents are phenol, p-cumylphenol and their chloroformates.

For oligomer preparation, the molar ratio of phosgene to bisphenol is conveniently maintained in the range of 0.1-0.9:1. For preparation of a transparent product, a molar ratio of 0.3-0.85:1 and preferably 0.5-0.8:1 is suitable. The pH of the aqueous phase of the reaction mixture is maintained in the range of 9-11. Tertiary amine proportions are typically in the range of 0.01-2.0 mole percent based on bisphenol. The oligomer concentration is in the range of 5-30% by weight, based on oligomer plus solvent. Chain termination agent, if present, may be in an amount up to 10 mole percent based on bisphenol. As noted hereinafter, however, introduction of chain termination agent at various stages of the process is contemplated and the amount present for oligomer preparation, if any, may be substantially less than the total to be employed overall.

Molecular weights (weight average relative to polystyrene, measured by gel permeation chromatography, whenever used herein in any context) for the oligomeric polycarbonates employed according to the present disclosure are not critical. However, they will, of course, be lower than the corresponding molecular weights of commercial polycarbonates. For the most part, illustrative molecular weights may be in the range of 1,000-8,000 g/mol or Daltons.

One feature of the disclosed methods is the ability to achieve a low haze product using only one charge of bisphenol, which in most instances is in the form of a solid and is therefore difficult to meter into the reaction mixture on a continuous or semi-continuous basis. Thus, in a preferred embodiment all the bisphenol employed in the process is furnished by the oligomeric polycarbonate. Other reagents may be supplied at various stages of the process, but the bisphenol-derived reagent is present in its entirety at the beginning.

In an alternative embodiment, a minor proportion of total bisphenol, generally up to 10% by weight of the total amount, may be introduced at one or more than one point subsequent to initial introduction thereof. The point or points of such introduction may be anywhere from immediately after initial bisphenol introduction to after siloxane-BCF (as defined hereinafter) introduction. A major purpose of later introduction of bisphenol is frequently to accommodate various process streams, particularly in a continuous reaction scheme.

The polyorganosiloxane bis(aryl)chloroformate, hereinafter sometimes designated "siloxane-BCF" for brevity, may be all or part of a previously synthesized batch or may be prepared as needed on a just-in-time basis. Particularly in the latter event, it need not be isolated or stored and may be employed in the form in which it was prepared.

Typical siloxane-BCFs have formula (45)

wherein A is an unsubstituted or substituted divalent aryl group, $R^6$ is a divalent $C_{2-8}$ alkyl group, each R is independently a $C_{1-8}$ alkyl group, and E is an average of 1 to 1,000.

Illustrative A radicals are 1,4-phenylene, 1,3-phenylene, 2-methyl-1,4-phenylene and 2-methoxy-1,4-phenylene which is often preferred by reason of the fact that eugenol is a readily available and thus preferred reactant for preparation of the siloxane-BCF. For the same reason. $R^6$ is often preferably 1,3-propylene, but other illustrative radicals are ethylene, 1,2-propylene and 1,4-butylene.

The R radicals may be aliphatic or aromatic and may contain substituents, usually halogen and especially fluorine. Illustrative R radicals are methyl, phenyl and 3,3,3-trifluoropropyl; methyl is usually preferred.

Phosgene ($COCl_2$) can be employed to convert siloxane bisphenol OH groups into the corresponding chloroformate groups. The amount of phosgene employed may influence product yield. Phosgene is preferably used in an amount corresponding to between 2.5 and 6, even more preferably between 3.5 and 5.5 moles of phosgene per mole of siloxane bisphenol OH group. Expressed in terms of moles of phosgene per mole of siloxane bisphenol employed, it is preferable to use between 5 and 12, and even more preferable between 7 and 11 moles of phosgene per mole of siloxane bisphenol.

The alkali metal hydroxide or alkaline earth metal hydroxide, or combination thereof is employed as an aqueous solution used in an amount preferably corresponding to between 3.5 and 6, and even more preferably between 4 and 5 moles of metal hydroxide per mole of phosgene employed. The concentration of the aqueous metal hydroxide solution employed is preferably between 5 and 25, and even more preferably between 17 and 25 percent by weight metal hydroxide. In certain embodiments the concentration of the metal hydroxide solution is at least 5 percent by weight. Of course, more concentrated solutions of metal hydroxide may be used, as long as they are supplemented with water such that the net metal hydroxide concentration in aqueous solution is 25% by weight or less.

The siloxane bisphenol is typically introduced into the reactor as a solution in a solvent. Typically the solvent is methylene chloride but can be any solvent suitable for use under interfacial reaction conditions. Typically halogenated solvents such as methylene chloride, chloroform, and 1,2-dichloroethane are preferred but other non-halogenated solvents such as toluene or ethyl acetate may also be used. Typically the concentration of the siloxane bisphenol in the solvent is in a range between 5 and 95, preferably between 10 and 30 percent by weight siloxane bisphenol. As noted, the siloxane bisphenol employed may be a single chemical species or a mixture of chemical species as is typical in siloxane bisphenols which typically comprise a distribution of bisphenols possessing siloxane subunits of varying chain lengths. Alternatively, the siloxane bisphenol may be introduced as an oil, without solvent.

In certain embodiments the siloxane bisphenol employed comprises formula (41), wherein each of R, E, M, $R^6$, and n are as described for formula (40).

Representative examples of siloxane bisphenols include, but are not limited to the following siloxane bisphenols

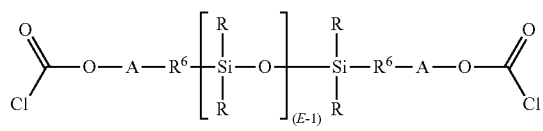 (45)

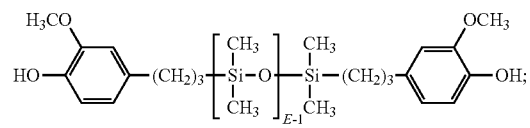 (46a)

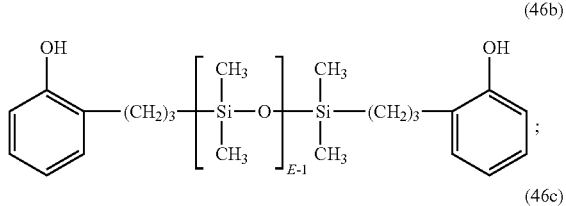

(46b)

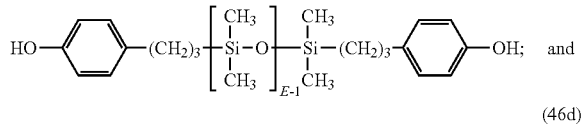

(46c)

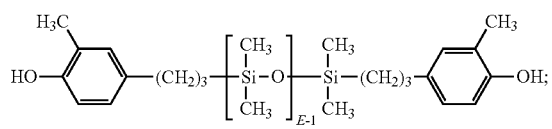

(46d)

wherein E averages 1 to 200.

Siloxane bisphenols may be prepared by hydrosilylation of an aliphatically unsaturated phenol with a siloxane dihydride in the presence of a platinum catalyst. This process is illustrated below for siloxane bisphenol (46a)

(46a)

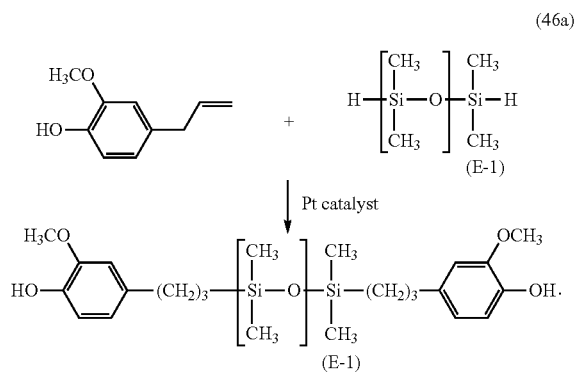

In certain embodiments where siloxane bisphenol (46a) is employed as a reactant. E averages between 1 and 200. In other embodiments siloxane bisphenol (46a) E averages between 40 and 50. Those skilled in the art will understand that the values given for E in formulae 46a-46d represent average values and that, for example, siloxane bisphenol (46a) having a value of E of 45 represents a mixture of siloxane bisphenol homologues having an average value of E of 45.

Typically, the reactants siloxane bisphenol, aqueous metal hydroxide, and phosgene are introduced at one or more upstream positions along the reactor. As mentioned, these reactants pass through the reactor, forming siloxane-BCF during passage from the point at which the reactants are introduced and the point at which an effluent stream containing siloxane-BCF emerges from the reactor. The time required for a reactant to travel from the point at which it is introduced to the point at which either it or a product derived from it emerges from the reactor is referred to as the residence time for the reactant. Typically, residence times for each reactant is in a range between 5 and 800 seconds, preferably between 10 and 500 seconds. Those skilled in the art will understand however that the most preferred residence time will depend upon the structure of the starting siloxane bisphenol, the type of reactor employed, and that the most preferred residence time may be determined by straightforward and limited experimentation.

In certain embodiments, at least one siloxane bisphenol, phosgene, and at least one alkali metal hydroxide or alkaline earth metal hydroxide are introduced into a flow reactor. The flow reactor is not particularly limited and may be any reactor system which provides for the "upstream" introduction of the reactants and the "downstream" removal of product bischloroformate. Suitable flow reactor systems include tubular reactors, continuous stirred tank reactors, loop reactors, column reactors, and combinations thereof. The flow reactor may comprise a series of flow reactor components, as for example, a series of continuous stirred tank reactors arrayed such that the effluent from a first continuous stirred tank reactor provides the input for a second continuous stirred tank reactor and so forth. Combinations of the various flow reactor components are illustrated by a first column reactor coupled to a downstream continuous stirred tank reactor where the output of the column reactor represents the feed to the continuous stirred tank reactor.

Additionally, the flow reactor may comprise flow reactor components arrayed in a parallel or network fashion, for example, as where the reactants are introduced into a parallel array of two or more tubular reactors the effluent of each of which is introduced into a single continuous stirred tank reactor. In certain embodiments the flow reactor comprises a series of tubular reactors. In other embodiments the flow reactor comprises a series of continuous stirred tank reactors. The reactants may be introduced into the flow reactor system through one or more feed inlets attached to the flow reactor system. Typically, it is preferred that the reactants be introduced into the flow reactor through at least three feed inlets, for example where a solution of the siloxane bisphenol in an organic solvent such as methylene chloride, aqueous alkali metal hydroxide, and phosgene are introduced through separate feed inlets at or near the upstream end of a tubular reactor. Alternative arrangements wherein one or more of the reactants is introduced through multiple feed inlets at various points along the flow reactor are also possible. Typically, the relative amounts of the reactants present in the flow reactor are controlled by the rate at which they are introduced. For example, a reactant can be introduced into the flow reactor through pumps calibrated to deliver a particular number of moles of said reactant per unit time.

In certain embodiments disclosed are methods for the preparation of siloxane-BCF (47)

(47)

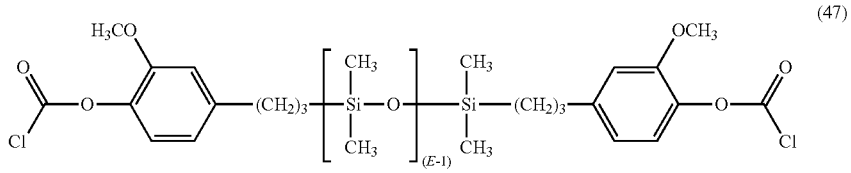

wherein E averages 1 to 200.

Said method comprising introducing into a tubular reactor siloxane bisphenol (46a), wherein E averages between 1 and 200, as a solution in methylene chloride comprising from 5 to 50 weight percent siloxane bisphenol (46a), an aqueous solution of sodium hydroxide, and phosgene, said phosgene being introduced at a rate such that the ratio of phosgene to siloxane bisphenol OH groups is in a range between 2.5 and 6 moles of phosgene per mole of siloxane bisphenol OH group, said aqueous solution of sodium hydroxide having a concentration of at least 5 percent by weight sodium hydroxide, said aqueous solution of sodium hydroxide being introduced at a rate such that the molar ratio of metal hydroxide to phosgene is in a range between 3.5 and 6.

Combination of the oligomeric aromatic polycarbonate with the siloxane-BCF is generally achieved by adding the siloxane-BCF, usually in solution in an organic liquid such as those previously identified, to the aqueous-organic mixture containing the oligomeric polycarbonate in the form of either a crude reaction mixture or a purified product, while maintaining the pH of the aqueous phase in the range of 9.0-13.5 which may be maintained by addition of aqueous base as necessary.

In certain embodiments, a tubular reactor containing the siloxane-BCF reaction mixture is fed to the main resin reactor while siloxane-BCF formation is initiated. "Tube start (%)" refers to the moment at which the tubular reactor starts operation based on the percentage of the total phosgene that will be added to the resin reactor for the formation of the polysiloxane-polycarbonate copolymer. For example, tube start at 50% means that after adding 50% of the total phosgene required to the resin reactor, the tubular reactor will initiate the addition of phosgene and the siloxane bisphenol to produce the siloxane-BCF. At this point, the siloxane-BCF is fed to the resin reactor, and reacts with the oligomeric polycarbonate to produce the polysiloxane-polycarbonate copolymer.

The tube start (%) may be 90%, 85%, 80%, 75%, 70%, 65%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1%.

The amount of phosgene added to the main resin reactor during formation of the oligomeric aromatic polycarbonate may not be more than, by weight, 90%, 85%, 80%, 75%, 70%, 65%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1% of the total phosgene employed in the method to produce polysiloxane-polycarbonate copolymer.

The proportion of siloxane-BCF relative to oligomeric polycarbonate is subject to wide variation. In its broadest sense, the ratio of equivalents of oligomer hydroxide to bischloroformate, i.e., the ratio of hydroxide groups to chloroformate groups, is greater than 1:1. It is preferably at least 4:1 and more preferably at least 10:1. It may often be as high as 3,000:1. To obtain a transparent product, it is generally advisable to maintain the proportion of organosiloxane units in the range of 0.1-30.0% by weight and the value of E in the range of 5-60.

The siloxane-BCF (e.g., eugenol-end capped D-45 chloroformate) or its corresponding dihydroxy monomer (e.g., eugenol-end capped D-45 siloxane) may have a polydispersity of less than 5, less than 4.5, less than 4, less than 3.5, less than 3, less than 2.9, less than 2.8, less than 2.7, less than 2.6, less than 2.5, less than 2.4, less than 2.3, less than 2.2, less than 2.1, less than 2, less than 1.9, less than 1.8, less than 1.7, less than 1.6, less than 1.5, less than 1.4, less than 1.3, less than 1.2, less than 1.1, or 1.0. The siloxane-BCF (e.g., eugenol-end capped D-45 chloroformate) or its corresponding dihydroxy monomer (e.g., eugenol-end capped D-45 siloxane) may have a polydispersity of 5, 4.5, 4, 3.5, 3, 2.9, 2.8, 2.7, 2.6, 2.5, 2.4, 2.3, 2.2, 2.1, 2, 1.9, 1.8, 1.7, 1.6, 1.5, 1.4, 1.3, 1.2, 1.1, or 1.

In certain embodiments, phosgenation of the reaction mixture and/or addition of chain termination agent can be continued during addition of the siloxane-BCF. Alternative embodiments involve interrupted phosgenation, the initial stage being during the preparation of the oligomeric aromatic polycarbonate and the subsequent stage beginning after some or all of the siloxane-BCF has been charged, with an optional delay after all of the siloxane-BCF has been introduced, said delay, when employed preferably being in the range of 1-5 minutes. Similarly, the chain termination agent may be added in full or in part prior to or during oligomeric aromatic polycarbonate preparation or divided between such preparation and later steps. Thus, addition of both of these reagents may be continuous or performed on a programmed schedule throughout the steps of oligomeric polycarbonate and siloxane-PC oligomer preparation.

In certain embodiments, the addition of the polyorganosiloxane bis(aryl)chloroformate to the oligomeric aromatic polycarbonate mixture may be complete before 65% of the total weight of phosgene required for formation of the of the polysiloxane-polycarbonate copolymer is added to the main resin reactor.

The addition of the polyorganosiloxane bis(aryl)chloroformate to the oligomeric aromatic polycarbonate mixture may be complete before 95%, 90%, 85%, 80%, 75%, 70%, 65%, 60%, 60%, 55%, 50%, 45%, 40%, 35%, 30%, 25%, or 20% of the total weight of phosgene required for formation of the of the polysiloxane-polycarbonate copolymer is added to the main resin reactor.

In a final step, phosgene and, optionally, chain termination agent are introduced to afford a product of a desired molecular weight. This step is most often conducted at a pH in the range of 9.5-11.5, preferably 10-11. Any desired molecular weight may be achieved in this step, with weight average values in the range of 20,000 g/mol to 100.000 g/mol being typical.

The cycle time is the batch time or total reaction time in the main resin reactor. The cycle time is the time required to complete the production of a single batch of the polysiloxane-polycarbonate copolymer. The cycle time may have a direct impact on the physical properties of the polysiloxane-polycarbonate copolymer. For example, a particular cycle time may lead to production of a polysiloxane-polycarbonate copolymer with a haze value of less than 1%.

The cycle time of the method may be at least 10 minutes. The cycle time may be at least 11 minutes, at least 12 minutes, at least 13 minutes, at least 14 minutes, at least 15 minutes, at least 16 minutes, at least 17 minutes, at least 18 minutes, at least 19 minutes, at least 20 minutes, at least 21 minutes, at least 22 minutes, at least 23 minutes, at least 24 minutes, at least 25 minutes, at least 26 minutes, at least 27 minutes, at least 28 minutes, at least 29 minutes, at least 30 minutes, at least 31 minutes, at least 32 minutes, at least 33 minutes, at least 34 minutes, at least 35 minutes, at least 36 minutes, at least 37 minutes, at least 38 minutes, at least 39 minutes, at least 40 minutes, at least 41 minutes, at least 42 minutes, at least 43 minutes, at least 44 minutes, at least 45 minutes, at least 46 minutes, at least 47 minutes, at least 48 minutes, at least 49 minutes, at least 50 minutes, at least 51 minutes, at least 52 minutes, at least 53 minutes, at least 54 minutes, at least 55 minutes, at least 56 minutes, at least 57 minutes, at least 58 minutes, at least 59 minutes, at least 60 minutes, at least 61 minutes, at least 62 minutes, at least 63 minutes, at least 64 minutes, at least 65 minutes, at least 66 minutes, at least 67 minutes, at least 68 minutes, at least 69 minutes, at least 70 minutes, at least 71 minutes, at least 72 minutes, at least 73 minutes, at least 74 minutes, at least 75 minutes, at least 76 minutes, at least 77 minutes, at least 78 minutes, at least 79 minutes, at least 80 minutes, at least 81 minutes, at least 82 minutes, at least 83 minutes, at least 84 minutes, at least 85 minutes, at least 86 minutes, at least 87 minutes, at least 88 minutes, at least 89 minutes, at least 90 minutes, at least 100 minutes, at least 110 minutes, or at least 120 minutes.

The cycle time may be 10 minutes. The cycle time may be 11 minutes, 12 minutes, 13 minutes, 14 minutes, 15 minutes, 16 minutes, 17 minutes, 18 minutes, 19 minutes, 20 minutes, 21 minutes, 22 minutes, 23 minutes, 24 minutes, 25 minutes, 26 minutes, 27 minutes, 28 minutes, 29 minutes, 30 minutes, 31 minutes, 32 minutes, 33 minutes, 34 minutes, 35 minutes, 36 minutes, 37 minutes, 38 minutes, 39 minutes, 40 minutes, 41 minutes, 42 minutes, 43 minutes, 44 minutes, 45 minutes, 46 minutes, 47 minutes, 48 minutes, 49 minutes, 50 minutes, 51 minutes, 52 minutes, 53 minutes, 54 minutes, 55 minutes, 56 minutes, 57 minutes, 58 minutes, 59 minutes, 60 minutes, 61 minutes, 62 minutes, 63 minutes, 64 minutes, 65 minutes, 66 minutes, 67 minutes, 68 minutes, 69 minutes, 70 minutes, 71 minutes, 72 minutes, 73 minutes, 74 minutes, 75 minutes, 76 minutes, 77 minutes, 78 minutes, 79 minutes, 80 minutes, 81 minutes, 82 minutes, 83 minutes, 84 minutes, 85 minutes, 86 minutes, 87 minutes, 88 minutes, 89 minutes, 90 minutes, 100 minutes, 110 minutes, or 120 minutes.

The % solids is the percentage of polysiloxane-polycarbonate copolymer, by weight, in the organic solvent of a single batch. The % solids may have a direct impact on the physical properties of the polysiloxane-polycarbonate copolymer.

The % solids may be 1% to 30%, 1% to 25%, 1% to 22%, 1% to 20%, 1% to 18%, 1% to 16%, 1% to 15%, 1% to 14%, 1% to 12%, 1% to 10%, 10% to 30%, 10% to 25%, 10% to 22%, 10% to 20%, 10% to 18%, 10% to 16%, 10% to 15%, 10% to 14%, 10% to 12%, 12% to 30%, 12% to 25%, 12% to 24%, 12% to 22%, 12% to 20%, 12% to 18%, 12% to 16%, 12% to 15%, 12% to 14%, 14% to 30%, 14% to 25%, 14% to 24%, 14% to 22%, 14% to 20%, 14% to 18%, 14% to 16%, 15% to 30%, 15% to 25%, 15% to 24%, 15% to 22%, 15% to 20%, 15% to 18%, 15% to 16%, 16% to 30%, 16% to 25%, 16% to 24%, 16% to 22%, 16% to 20%, 16% to 18%, 18% to 30%, 18% to 25%, 18% to 24%, 18% to 22%, 18% to 20%, 20% to 30%, 20% to 25%, 20% to 24%, or 20% to 22%. The % solids may be at least 1%, at least 2%, at least 3%, at least 4%, at least 5%, at least 6%, at least 7%, at least 8%, at least 9%, at least 10%, at least 11%, at least 12%, at least 13%, at least 14%, at least 15%, at least 16%, at least 17%, at least 18%, at least 19%, at least 20%, at least 21%, at least 22%, at least 23%, at least 24%, at least 25%, at least 26%, at least 27%, at least 28%, at least 29%, or at least 30%. The % solids may be less than 30%, less than 29%, less than 28%, less than 27%, less than 26%, less than 25%, less than 24%, less than 23%, less than 22%, less than 21%, less than 20%, less than 19%, less than 18%, less than 17%, less than 16%, less than 15%, less than 14%, less than 13%, less than 12%, less than 11%, or less than 10%. In certain embodiments, the % solids ranges from 10% to 24%, or from 18% to 22%.

The polysiloxane-polycarbonate copolymer prepared by the method of this disclosure may be isolated by conventional means; for example, by anti-solvent precipitation followed by vacuum drying.

The properties of the starting materials in conjunction with the method employed for forming the polysiloxane-polycarbonate copolymer may affect the physical properties of the polysiloxane-polycarbonate copolymer product.

In certain embodiments, the hydroxylaryl terminated polydiorganosiloxane oligomers used to produce the polyorganosiloxane bis(aryl)chloroformate have a polydispersity of less than 2, and a molded plaque prepared from the polysiloxane-polycarbonate copolymer has a haze value of less than 1%.

In certain embodiments, the cycle time for preparing the polysiloxane-polycarbonate copolymer is at least 18 minutes, and a molded plaque prepared from the polysiloxane-polycarbonate copolymer has a haze value of less than 1%.

In certain embodiments, the cycle time for preparing the polysiloxane-polycarbonate copolymer is at least 23 minutes, and a molded plaque prepared from the polysiloxane-polycarbonate copolymer has a haze value of less than 1%.

In certain embodiments, the tube start (%), or the amount of phosgene added to the main resin reactor during formation of the oligomeric aromatic polycarbonate is not more than 60% by weight of the total phosgene employed in the method, and a molded plaque prepared from the polysiloxane-polycarbonate copolymer has a haze value of less than 1%.

In certain embodiments, the tube start (%), or the amount of phosgene added to the main resin reactor during formation of the oligomeric aromatic polycarbonate is not more than 30% by weight of the total phosgene employed in the method, and a molded plaque prepared from the polysiloxane-polycarbonate copolymer has a haze value of less than 1%.

In certain embodiments, the hydroxylaryl terminated polydiorganosiloxane oligomers used to produce the polyorganosiloxane bis(aryl)chloroformate have a polydispersity of less than 2, the cycle time for preparing the polysiloxane-polycarbonate copolymer is at least 23 minutes, and the tube start (%), or the amount of phosgene added to the main resin reactor during formation of the oligomeric aromatic polycarbonate is not more than 60% by weight of the total phosgene employed in the method, and a molded plaque prepared from the polysiloxane-polycarbonate copolymer has a haze value of less than 1%.

In certain embodiments, the hydroxylaryl terminated polydiorganosiloxane oligomers used to produce the polyorganosiloxane bis(aryl)chloroformate have a polydispersity of less than 2, the cycle time for preparing the polysiloxane-polycarbonate copolymer is at least 23 minutes, and the tube start (%), or the amount of phosgene added to the main resin reactor during formation of the oligomeric aromatic polycarbonate is not more than 30% by weight of the total phosgene employed in the method, and a molded plaque prepared from the polysiloxane-polycarbonate copolymer has a haze value of less than 1%.

In certain embodiments, the hydroxylaryl terminated polydiorganosiloxane oligomers used to produce the polyorganosiloxane bis(aryl)chloroformate have a polydispersity of greater than 2, the cycle time for preparing the polysiloxane-polycarbonate copolymer is at least 23 minutes, and the tube start (%), or the amount of phosgene added to the main resin reactor during formation of the oligomeric aromatic polycarbonate is not more than 30% by weight of the total phosgene employed in the method, and a molded plaque prepared from the polysiloxane-polycarbonate copolymer has a haze value of less than 1%.

In certain embodiments, the hydroxylaryl terminated polydiorganosiloxane oligomers used to produce the polyorganosiloxane bis(aryl)chloroformate have a polydispersity of less than 2, the cycle time for preparing the polysiloxane-polycarbonate copolymer is at least 18 minutes, and the tube start (%), or the amount of phosgene added to the main resin reactor during formation of the oligomeric aromatic polycarbonate is not more than 30% by weight of the total phosgene employed in the method, and a molded plaque prepared from the polysiloxane-polycarbonate copolymer has a haze value of less than 1%.

In certain embodiments, the hydroxylaryl terminated polydiorganosiloxane oligomers used to produce the polyorganosiloxane bis(aryl)chloroformate have a polydispersity of greater than 2, the cycle time for preparing the polysiloxane-polycarbonate copolymer is at least 18 minutes, the tube start (%), or the amount of phosgene added to the main resin reactor during formation of the oligomeric aromatic polycarbonate is not more than 30% by weight of the total phosgene employed in the method, the % solids is less than 17% by weight of the total organic solvent employed in the method, and a molded plaque prepared from the polysiloxane-polycarbonate copolymer has a haze value of less than 1%.

In certain embodiments, the hydroxylaryl terminated polydiorganosiloxane oligomers used to produce the polyorganosiloxane bis(aryl)chloroformate have a polydispersity of less than 3, the cycle time for preparing the polysiloxane-polycarbonate copolymer is at least 18 minutes, the tube start (%), or the amount of phosgene added to the main resin reactor during formation of the oligomeric aromatic polycarbonate is not more than 30% by weight of the total phosgene employed in the method, the % solids is at least 15%, and a molded plaque prepared from the polysiloxane-polycarbonate copolymer has a haze value of less than 1%.

The disclosed methods can afford polysiloxane-polycarbonate copolymers which can be molded into articles of high transparency, as evidenced by a low percentage of haze in molded plaques.

Shaped, formed, or molded articles comprising the polycarbonate compositions are also provided. The article may be a metallized article. The article may be metallized with, for example, chrome, nickel, or aluminum. The article may optionally include an intervening base coat between the molded article and the metal.

Articles that can be prepared using the polycarbonate compositions include, for example, computer and business machine housings such as housings for monitors, handheld electronic device housings such as housings for cell phones, electrical connectors, medical devices, home appliances (e.g., housewares and kitchen appliances), protective face shields, police riot shields, kettles (e.g., tea kettles, water kettles, and the like), membrane devices, and components of lighting fixtures, ornaments, roofs, greenhouses, sun rooms, swimming pool enclosures, and the like.

Other representative articles that may be fabricated using the thermoplastic compositions provided herein include headlamps, tail lamps, tail lamp housings; enclosures for electrical and telecommunication devices: outdoor furniture: boats and marine equipment, including trim, enclosures, and housings; building and construction applications such as glazing, roofs, windows; treated covers for pictures, paintings, posters, and like display items; optical lenses; ophthalmic lenses; corrective ophthalmic lenses; implantable ophthalmic lenses; wall panels and doors; protected graphics: outdoor and indoor signs; enclosures, housings, panels, and parts for automatic teller machines (ATM); window and door trim; sports equipment and toys, parts for snowmobiles; recreational vehicle panels and components; playground equipment; mobile phone housings; meter housings; coated helmets and personal protective equipment; coated synthetic or natural textiles; coated photographic film and photographic prints: food molds (e.g., chocolate molds, and so forth); and like applications. Additional fabrication operations may be performed on articles, such as, but not limited to molding, in-mold decoration, baking in a paint oven, lamination, and/or thermoforming.

In certain embodiments, there is provided an article formed from the compositions, where the compositions include one or more additives such as, for example, antioxidants, flame retardants, heat stabilizers, light stabilizers, antistatic agents, colorants, and the like. An antioxidant stabilizer composition can be used, such as for example a hindered diol stabilizer, a thioester stabilizer, an amine stabilizer, a phosphite stabilizer, or a combination comprising at least one of the foregoing types of stabilizers.

The polycarbonate compositions may be molded into useful shaped articles by a variety of methods, such as injection molding, extrusion, rotational molding, compression molding, blow molding, sheet or film extrusion, profile extrusion, gas assist molding, structural foam molding, and thermoforming. Additional fabrication operations for preparing the articles include, but are not limited to, molding, in-mold decoration, baking in a paint oven, lamination, metallization, and/or thermoforming.

Various types of gates can be employed for preparing molded articles, such as for example, side gates, spoke gates, pin gates, submarine gates, film gates, disk gates, or any combination thereof. Considerations in gating include part design, flow, end use requirements, and location of in-mold graphics. The standard guidelines of traditional gating can apply, along with several extra considerations. For example, one gate can be used whenever possible to minimize the potential for wrinkling a film. Gates can be located away from end-use impact as well as to provide flow from thick to thin sections to minimize weld lines. Gates can also be located at right angles to a runner to minimize jetting, splay and gate blush. Large parts requiring multiple gates can include gate positions close enough together to reduce pressure loss. Sequential gating can be used to prevent folding of a film at weld lines. Gate land lengths can be kept as short as possible. An impinging gate can be used to ensure that the incoming flow is directed against the cavity wall or core to prevent jetting. Venting (particularly full perimeter venting) can be accomplished by knock outs, cores, and parting lines and can be used whenever possible to avoid trapped gas that can burn and rupture a film. In addition, flow restrictions near gate areas can increase the potential for wash out due to increased shear. If bosses, core shutoffs, etc., are needed near a gate, rounded features or corners can be used to reduce shear. Gating for distributing injection pressure over a large area, thus reducing the shear forces at the gate, include fan gates and submarine gates that enter the part via a rib. It is common to add a puddle or thicker area at a gate entrance point for gates like valve gates, hot drops, and cashew gates.

The article may be produced by a manufacturing process. The process may include (a) providing a polycarbonate composition as disclosed herein: (b) melting the composition, for example at 200-400° C., 225-350° C., or 270-300° C., in an extruder; (c) extruding the composition; and (d) isolating the composition. The article may be further produced by (e) drying the composition and (f) melt forming the composition.

EXAMPLES

The disclosed compositions and methods are illustrated by the following examples. All parts and percentages are by weight. Plaque haze and Db* measurements were made on ASTM 3.18 mm (⅛ in) plaques. Haze measurements utilized a BYK Gardner Haze-Gard Plus instrument using Method A and Illuminant C. Db* values were obtained using a Macbeth COLOR-EYE™ 7000A reference spectrophotometer, using reference values for L* of 95.957, a* of −0.015, and b* of 0.42.

Haze measurements were made according to ASTM D1003-07 (2007). Db* measurements were made according to ASTM D2244-09b (2010).

Molecular weight determinations are performed using GPC, using a cross-linked styrene-divinylbenzene column and calibrated to bisphenol-A polycarbonate standards using a UV-VIS detector set at 254 nm. Samples are prepared at a concentration of 1 mg/mL, and eluted at a flow rate of 1.0 mL/min.

Determination of Polydispersity (Mw/Mn) of Eugenol End-Capped polydimethylsiloxane samples by SEC-UV was achieved using a cross-linked styrene-divinylbenzene column with an ultraviolet-diode array (UV-DAD) detector set to detect at 254 nm. Molecular weight and PDI calibration were done with twelve monodisperse polystyrene (PS) standards. The samples were dissolved in dichloromethane (1200-1300 ppm) with an injection volume of 10 μL. The mobile phase was dichloromethane at a 0.3 mL/min flow rate.

Example 1. Preparation of Transparent Siloxane—BPA Polycarbonate Copolymer with 22% Solids in Reaction A polysiloxane-polycarbonate copolymer that contains 5.8 weight % dimethylsiloxane in D45 blocks was prepared by generating a D45 siloxane-bischloroformate via a tubular reactor. The procedure and methods are as follows.

To the formulation tank was added dichloromethane (8 liters (L)), deionized (DI) water (9 L), bisphenol-A (4000 g, 17.5 moles), p-cumylphenol (160 g, 0.75 mole), triethylamine (30 g, 0.30 mole) and sodium gluconate (10 grams (g)). The mixture was transferred to the batch reactor. The formulation tank was rinsed with dichloromethane (3 L) and transferred to the batch reactor. The reactor agitator was activated and circulation flow was set at 80 liters per minute (L/min). Phosgene flow to the reactor was initiated (segment 1: 230 g, 80 grams per minute (g/min) rate). A pH target of 10.0 was maintained throughout the batch by the controlled addition of 33% aqueous sodium hydroxide. After 230 g phosgene was added to the batch reactor, the tubular reactor initiated to add eugenol-end capped D-45 chloroformate to the batch reactor (312 g, 0.08 mole, 20 wt % solution in dichloromethane chilled to 10° C.). The D45 solution flow rate to the tubular reactor was 500 g/min (3.1 min addition cycle) with phosgene addition to the tubular reactor at 28 g/min (5 mol phosgene/mol D45 OH group) and 18% aqueous sodium hydroxide flow to the tubular reactor at 316 g/min (5 mol NaOH/mol phosgene, chilled to 4° C.). After completion of siloxane addition via the tubular reactor, the tubular reactor was flushed with dichloromethane (0.2 L) and DI water (2 L) to the batch reactor. Phosgene flow continued to the batch reactor during the tubular reactor cycle (segment 2: 2070 g, 80 g/min rate). The total phosgene addition time to the batch reactor was 29 minutes. After completion of the phosgene addition, a sample of the reactor was obtained and verified to be free of un-reacted BPA and free of chloroformate. Mw of the reaction sample was determined by GPC. The reactor was purged with nitrogen then the batch was transferred to the centrifuge feed tank.

To the batch in the feed tank was added dilution dichloromethane (8 L), then the mixture was purified using a train of liquid-liquid centrifuges. Centrifuge one removed the brine phase. Centrifuge two removed the catalyst by extracting the resin solution with aqueous hydrochloric acid (pH 1). Centrifuges three through eight removed residual ions by extracting the resin solution with DI water. A sample of the resin solution was tested and verified for less than 5 ppm each of ionic chloride and residual triethylamine.

The resin solution was transferred to the precipitation feed tank. The resin was isolated as a white powder by steam precipitation followed by drying in a cone shaped dryer using heated nitrogen (130° C.).

A series of copolymers were synthesized using the procedure of Example 1 to study the effects of tube start %, PDI of the polysiloxane blocks used in the production of D45 siloxane bis-chloroformate, cycle time, and % solids on the % haze of the resulting polysiloxane-polycarbonate copolymer. Results are shown in Table 1.

Runs 1-3 of Table 1 demonstrate that when employing a starting polysiloxane with PDI greater than 2, a tube start at 30% with normal cycle time resulted in less haze in the polysiloxane-PC copolymer. Similarly, runs 4-6 of Table 1 demonstrate that a tube start at 30% with a fast cycle time resulted in less haze in the polysiloxane-PC copolymer. Run 7 of Table 1 show that a % haze of the polysiloxane-PC copolymer of less than 1 was achieved by employing a starting polysiloxane with PDI of less than 2, a tube start of 60%, and a normal cycle time. Under the same conditions, but with a fast cycle time, Run 8 showed almost no transparency.

TABLE 1

| % Haze of polysiloxane-polycarbonate copolymers (5.8 wt % siloxane) with 22% solids in reaction | | | | |
|---|---|---|---|---|
| Run | % Haze (molded plaques) | PDI of polysiloxane | Tube Start % | Cycle time |
| 1 | 1.09 | >2 (2.4) | 10 | Normal[1] |
| 2 | 0.92 | | 30 | Normal[1] |
| 3 | 1.54 | | 50 | Normal[1] |
| 4 | 1.17 | | 30 | Fast[2] |
| 5 | 1.30 | | 50 | Fast[2] |
| 6 | 98.7 | | 60 | Fast[2] |
| 7 | 0.83 | <2 | 60 | Normal[1] |
| 8 | 86.4 | | 60 | Fast[2] |

[1]Normal cycle time = 27.5 min or greater
[2]Fast cycle time = 18 min

Example 2. Preparation of Transparent Siloxane—BPA Polycarbonate Copolymer with 15.5% Solids in Reaction A solution of p-cumylphenol (157 grams, 0.74 moles, 4.0 mole %) was prepared in 500 mL of dichloromethane. The p-cumylphenol (PCP) solution was placed in an addition pot connected to the main reactor via a dosing pump.

A solution of eugenol capped D45 siloxane (312 g, 0.0082 mole, 5.8 wt % siloxane) was prepared in 900 milliliter (mL) of dichloromethane. The D45 siloxane solution was placed in an addition tank connected to a tubular reactor via a dosing pump. The tubular reactor (½ inch diameter×15 feet length, spiral upflow) is connected to the main batch reactor.

To the formulation tank was added dichloromethane (13 L). DI water (8 L), bisphenol-A (4000 grams, 17.5 moles), triethylamine (30 grams, 0.30 moles) and sodium gluconate (10 grams, iron scavenger). The mixture was stirred for 5 minutes, then transferred to the 70 L batch reactor which was equipped with an overhead condenser, circulation loop, pH probe and various material addition nozzles. The formulation tank was rinsed with dichloromethane (5 L) which was transferred to the batch reactor. The reactor agitator was started and the circulation flow was set at 80 L/min. Phosgene vapor flow to the reactor was initiated (80 g/min flow rate) by the Distributive Control System (DCS) and an initial amount (220 grams, 2.2 moles) was added. The pH of the reaction was maintained at a target of 10.0 by controlled addition of 33% aqueous NaOH.

After addition of the initial amount of phosgene, the PCP solution was added to the reactor at 250 mL/min flow rate while phosgene flow to the reactor continued. At the same time the feed to the tubular reactor was initiated with D45 siloxane flow (500 g/min) combining with phosgene (28 g/min, 0.28 mole/min) and 18% aqueous NaOH (316 g/min, 1.4 moles/min) in the plug flow reactor directly feeding into the batch reactor. After completion of the dosing of the D45 siloxane mixture to the reaction, the flow of phosgene and aqueous NaOH was stopped and the tubular reactor was flushed with dichloromethane (2 L). Phosgene addition to the batch reactor continued with pH control throughout the additions and until the total set point was reached (2200 grams, 22.2 moles). After completion of the phosgene addition, a sample of the reactor was obtained and verified to be free of un-reacted BPA and free of chloroformate. The molecular weight of a reaction sample was determined by GPC using a UV detector.

A series of copolymers were synthesized using the procedure of Example 2 to study the effects of tube start %, PDI of the polysiloxane blocks used in the production of D45 siloxane bis-chloroformate, cycle time, and % solids on the % haze and Db* of the resulting polysiloxane-polycarbonate copolymer. Tube start was kept constant for all four runs at 30%. Results are shown in Table 2.

Runs 9-12 of Table 2 demonstrate that with lower % solids in reaction, a % haze of less than 1 for the polysiloxane-polycarbonate copolymer is less dependent upon the PDI of the polysiloxane. In addition, normal cycle times as well as a tube start of 30% were demonstrated to be beneficial in reducing % haze of the polysiloxane-polycarbonate copolymer.

TABLE 2

% Haze of polysiloxane-polycarbonate copolymers with %15.5 solids and tube start at 30% of total phosgene

| Run | % Haze (molded plaques) | Db* | Mw | Siloxane content | PDI of polysiloxane | Cycle time |
|---|---|---|---|---|---|---|
| 9 | 0.84 | 2.88 | 23120 | 6.5 | >2 (2.4) | Normal |
| 10 | 0.95 | 3.4 | 23300 | 5.8 | >2 (2.4) | Fast |
| 11 | 0.56 | 2.2 | 23100 | 6.1 | <2 | Normal |
| 12 | 0.67 | 2.6 | 22940 | 5.9 | <2 | Fast |

1. Normal cycle time = 27.5 min or greater
2. Fast cycle time = 18 min

Overall, these results demonstrate a directly proportional relationship between the % haze of polysiloxane-polycarbonate copolymers produced on commercial scale with the PDI of the eugenol end-capped D45 siloxane oligomers employed in the process. These results also demonstrate the beneficial effect of a 30% tube start.

For reasons of completeness, various aspects of the present disclosure are set out in the following numbered clauses:

Clause 1. A method for preparing a polysiloxane-polycarbonate copolymer comprising: (a) contacting a dihydroxyaromatic compound with a continuous supply of phosgene under interfacial reactions conditions, in aqueous-organic solvent at a pH of 9-12, in the presence of at least one tertiary amine, to form a mixture; (b) combining a monohydroxyaromatic compound with the mixture to produce an oligomeric aromatic polycarbonate mixture, with additional introduction of phosgene, wherein the amount of phosgene added in steps (a) and (b) is not more than 60% by weight of the total phosgene employed in the method; (c) combining a mixture of a polyorganosiloxane bis(aryl)chloroformate in aqueous-organic solvent with the oligomeric aromatic polycarbonate mixture, with additional introduction of phosgene, before 65% of the total weight of phosgene is added, to form a reaction mixture; and (d) adding the remainder of the phosgene to the reaction mixture, while stirring, to afford a polysiloxane-polycarbonate copolymer of a desired molecular weight; wherein a molded plaque prepared from the polysiloxane-polycarbonate copolymer has a haze value of less than 3%; wherein the hydroxylaryl terminated polydiorganosiloxane oligomers used to produce the polyorganosiloxane bis(aryl)chloroformate have a polydispersity of less than 3.0.

Clause 2. The method of clause 1, wherein the dihydroxyaromatic compound is bisphenol A (BPA).

Clause 3. The method of clause 1 or clause 2, wherein the monohydroxyaromatic compound is selected from the group consisting of phenol and para-cumylphenol (PCP), or a combination thereof.

Clause 4. The method of any one of clauses 1-3, wherein the monohydroxyaromatic compound is para-cumylphenol (PCP).

Clause 5. The method of any one of clauses 1-4, wherein the oligomeric aromatic polycarbonate is a BPA polycarbonate.

Clause 6. The method of any one of clauses 1-5, wherein the oligomeric aromatic polycarbonate is a PCP end-capped BPA polycarbonate.

Clause 7. The method of any one of clauses 1-6, wherein the polyorganosiloxane bis(aryl)chloroformate has formula (X)

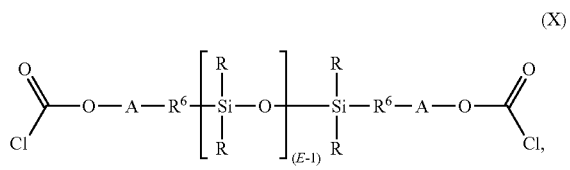

(X)

wherein
A is an unsubstituted or substituted divalent aryl group,
$R^6$ is a divalent $C_{2-8}$ alkyl group,
each R is independently a $C_{1-8}$ alkyl group, and
E is an average of 1 to 200.

Clause 8. The method of clause 7, wherein A is

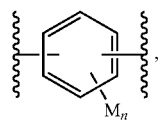

wherein M is independently selected from the group consisting of halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, and n is independently 0, 1, 2, 3, or 4.

Clause 9. The method of clause 7, wherein A is selected from the group consisting of:

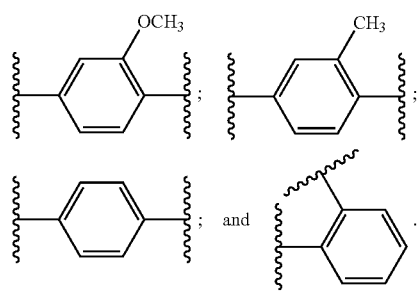

Clause 10. The method of any one of clauses 1-9, wherein the polyorganosiloxane bis(aryl)chloroformate has formula (Y)

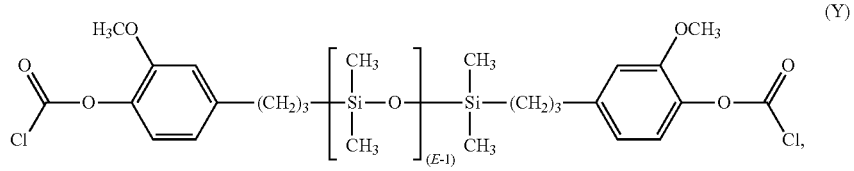

wherein E is an average of 10 to 90.

Clause 11. The method of any one of clauses 1-10, wherein E is an average of 10 to 90.

Clause 12. The method of any one of clauses 1-11, wherein E is an average of 30 to 60.

Clause 13. The method of any one of clauses 1-12, wherein E is an average of 45 to 50.

Clause 14. The method of any one of clauses 1-13, wherein the polyorganosiloxane bis(aryl)chloroformate is prepared by introducing into a reactor a solution of formula (Z)

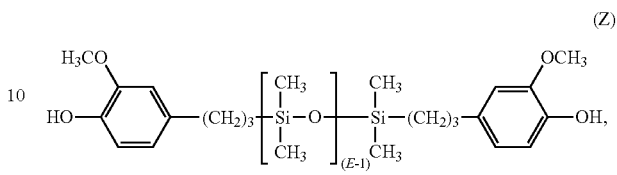

wherein E is an average of 10 to 200;
the solution comprising methylene chloride, an aqueous solution of sodium hydroxide, and phosgene, said phosgene being introduced at a rate such that the ratio of phosgene to the formula (Z) OH groups is in a range between 2.5 and 6 moles of phosgene per mole of formula (Z) OH group, said aqueous solution of sodium hydroxide having a concentration of at least 5 percent by weight sodium hydroxide, said aqueous solution of sodium hydroxide being introduced at a rate such that the molar ratio of metal hydroxide to phosgene is in a range between 3.5 and 6.

Clause 15. The method of any one of clauses 1-14, wherein the polysiloxane-polycarbonate copolymer is a siloxane block co-polycarbonate comprising, by weight, 1% siloxane to 30% siloxane.

Clause 16. The method of any one of clauses 1-15, wherein the polysiloxane-polycarbonate copolymer is a siloxane block co-polycarbonate comprising, by weight, 1% siloxane to 20% siloxane.

Clause 17. The method of any one of clauses 1-16, wherein the polysiloxane-polycarbonate copolymer is a siloxane block co-polycarbonate comprising, by weight, 3% siloxane to 8% siloxane.

Clause 18. The method of any one of clauses 1-17, wherein the polysiloxane-polycarbonate copolymer is a siloxane block co-polycarbonate comprising, by weight, 6%.

Clause 19. The method of any one of clauses 1-18, wherein the polysiloxane-polycarbonate copolymer is a PCP end-capped BPA polycarbonate-polydimethylsiloxane copolymer comprising 6 wt % siloxane, having an average polydimethylsiloxane block length of 45 units, and having a Mw of 17.000 g/mol to 35,000 g/mol, as determined by GPC using BPA polycarbonate standards.

Clause 20. The method of any one of clauses 1-19, wherein the polysiloxane-polycarbonate copolymer is a PCP end-capped BPA polycarbonate-polydimethylsiloxane copolymer comprising 6 wt % siloxane, having an average polydimethylsiloxane block length of 45 units, and having a Mw of 20.000 g/mol to 30,000 g/mol, as determined by GPC using BPA polycarbonate standards.

Clause 21. The method of any one of clauses 1-20, wherein the polysiloxane-polycarbonate copolymer is a PCP end-capped BPA polycarbonate-polydimethylsiloxane copolymer comprising 6 wt % siloxane, having an average polydimethylsiloxane block length of 45 units, and having a Mw of 22,000 g/mol to 24.000 g/mol, as determined by GPC using BPA polycarbonate standards.

Clause 22. The method of any one of clauses 1-21, wherein the organic solvent of step (a) is a chlorinated organic solvent.

Clause 23. The method of any one of clauses 1-22, wherein the organic solvent of step (a) is dichloromethane.

Clause 24. The method of any one of clauses 1-23, wherein the tertiary amine is triethylamine.

Clause 25. The method of any one of clauses 1-24, wherein pH is controlled by addition of an aqueous alkaline solution.

Clause 26. The method of any one of clauses 1-25, wherein pH is controlled by addition of an aqueous sodium hydroxide solution.

Clause 27. The method of any one of clauses 1-26, wherein the organic solvent of step (c) is a chlorinated organic solvent.

Clause 28. The method of any one of clauses 1-27, wherein the organic solvent of step (c) is dichloromethane.

Clause 29. The method of any one of clauses 1-28, wherein the monohydroxyaromatic compound of step (b) is added to the mixture of step (a).

Clause 30. The method of any one of clauses 1-29, wherein the polyorganosiloxane bis(aryl)chloroformate is added to the oligomeric aromatic polycarbonate.

Clause 31. The method of any one of clauses 1-30, wherein the polyorganosiloxane bis(aryl)chloroformate is in the form of a crude reaction mixture.

Clause 32. The method of any one of clauses 1-31, wherein the amount of phosgene added in steps (a) and (b) is not more than 50% by weight of the total phosgene employed in the method.

Clause 33. The method of any one of clauses 1-32, wherein the amount of phosgene added in steps (a) and (b) is not more than 30% by weight of the total phosgene employed in the method.

Clause 34. The method of any one of clauses 1-33, wherein the amount of phosgene added in steps (a) and (b) is not more than 10% by weight of the total phosgene employed in the method.

Clause 35. The method of any one of clauses 1-34, wherein a molded plaque prepared from the polysiloxane-polycarbonate copolymer has a haze value of less than 2%.

Clause 36. The method of any one of clauses 1-35, wherein a molded plaque prepared from the polysiloxane-polycarbonate copolymer has a haze value of less than 1%.

Clause 37. The method of any one of clauses 1-36, wherein a molded plaque with 3.18 mm thickness prepared from the polysiloxane-polycarbonate copolymer has a Db* value of less than 3, as measured according to ASTM D2244-09b.

Clause 38. The method of any one of clauses 1-27, wherein a molded plaque with 3.18 mm thickness prepared from the polysiloxane-polycarbonate copolymer has a Db* value of less than 2.5, as measured according to ASTM D2244-09b.

Clause 39. The method of any one of clauses 1-38, wherein the cycle time for preparing the polysiloxane-polycarbonate copolymer is at least 18 minutes.

Clause 40. The method of any one of clauses 1-39, wherein the cycle time for preparing the polysiloxane-polycarbonate copolymer is at least 23 minutes.

Clause 41. The method of any one of clauses 1-40, wherein the cycle time for preparing the polysiloxane-polycarbonate copolymer is at least 30 minutes.

Clause 42. The method of any one of clauses 1-41, wherein the cycle time for preparing the polysiloxane-polycarbonate copolymer is at least 60 minutes.

Clause 43. The method of any one of clauses 1-42, wherein the cycle time for preparing the polysiloxane-polycarbonate copolymer is at least 90 minutes.

Clause 44. The method of any one of clauses 1-43, wherein the hydroxylaryl terminated polydiorganosiloxane oligomers used to produce the polyorganosiloxane bis(aryl) chloroformate have a polydispersity of less than 2.6.

Clause 45. The method of any one of clauses 1-44, wherein the hydroxylaryl terminated polydiorganosiloxane oligomers used to produce the polyorganosiloxane bis(aryl) chloroformate have a polydispersity of less than 2.

Clause 46. The method of any one of clauses 1-45, wherein the % solids for preparing the polysiloxane-polycarbonate copolymer is 10% to 24%.

Clause 47. The method of any one of clauses 1-46, wherein the % solids for preparing the polysiloxane-polycarbonate copolymer is 15% to 22%.

Clause 48. The method of any one of clauses 1-47, wherein the % solids for preparing the polysiloxane-polycarbonate copolymer is at least 15%.

Clause 49. The method of any one of clauses 1-48, wherein the hydroxylaryl terminated polydiorganosiloxane oligomers used to produce the polyorganosiloxane bis(aryl) chloroformate have a polydispersity of less than 2, and wherein a molded plaque prepared from the polysiloxane-polycarbonate copolymer has a haze value of less than 1%, as measured according to ASTM D1003-07.

Clause 50. The method of any one of clauses 1-49, wherein the cycle time for preparing the polysiloxane-polycarbonate copolymer is at least 23 minutes, and wherein a molded plaque prepared from the polysiloxane-polycarbonate copolymer has a haze value of less than 1%, as measured according to ASTM D1003-07.

Clause 51. The method of any one of clauses 1-50, wherein the amount of phosgene added in steps (a) and (b) is not more than 30% by weight of the total phosgene to be employed in the method, and wherein a molded plaque prepared from the polysiloxane-polycarbonate copolymer has a haze value of less than 1%, as measured according to ASTM D1003-07.

Clause 52. The method of any one of clauses 1-51, wherein the hydroxylaryl terminated polydiorganosiloxane oligomers used to produce the polyorganosiloxane bis(aryl) chloroformate have a polydispersity of less than 2, wherein the cycle time for preparing the polysiloxane-polycarbonate copolymer is at least 23 minutes, wherein the amount of phosgene added in steps (a) and (b) is not more than 60% by weight of the total phosgene employed in the method, and wherein a molded plaque prepared from the polysiloxane-polycarbonate copolymer has a haze value of less than 1%, as measured according to ASTM D1003-07.

Clause 53. The method of any one of clauses 1-52, wherein the hydroxylaryl terminated polydiorganosiloxane oligomers used to produce the polyorganosiloxane bis(aryl) chloroformate have a polydispersity of less than 2, wherein the cycle time for preparing the polysiloxane-polycarbonate copolymer is at least 23 minutes, wherein the amount of phosgene added in steps (a) and (b) is not more than 30% by weight of the total phosgene employed in the method, and wherein a molded plaque prepared from the polysiloxane-polycarbonate copolymer has a haze value of less than 1%, as measured according to ASTM D1003-07.

Clause 54. The method of any one of clauses 1-53, wherein the hydroxylaryl terminated polydiorganosiloxane oligomers used to produce the polyorganosiloxane bis(aryl) chloroformate have a polydispersity of less than 3, wherein the cycle time for preparing the polysiloxane-polycarbonate copolymer is at least 18 minutes, wherein the amount of phosgene added in steps (a) and (b) is not more than 30% by weight of the total phosgene employed in the method, where the % solids is at least 15%, and wherein a molded plaque prepared from the polysiloxane-polycarbonate copolymer has a haze value of less than 1%, as measured according to ASTM D1003-07.

Clause 55. The method of any one of clauses 1-54, wherein the amount of the polysiloxane-polycarbonate copolymer produced in one cycle is at least 2.000 kg.

Clause 56. The method of any one of clauses 1-55, wherein the amount of the polysiloxane-polycarbonate copolymer produced in one cycle is at least 2,500 kg.

Clause 57. The method of any one of clauses 1-56, wherein the amount of the polysiloxane-polycarbonate copolymer produced in one cycle is at least 3.000 kg.

Clause 58. An article selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, circuit breakers, electrical and electronic housings, running boards, instrument screens, helmet or other protective device, fire helmets, face shields, safety glasses, eyeglasses, light fixtures, flashlight and lantern lenses, light fixtures, and motor vehicle headlight lenses and covers, or any combination thereof; wherein the article comprises at least one polysiloxane-polycarbonate copolymer produced by the method of any one of clauses 1-57.

Clause 59. A metallized article, wherein the article comprises at least one polysiloxane-polycarbonate copolymer produced by the method of any one of clauses 1-57.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims. The appended claims should be construed broadly and in a manner consistent with the spirit and the scope of the invention herein.

What is claimed is:

1. A method for preparing a polysiloxane-polycarbonate copolymer comprising:
   (a) contacting a dihydroxyaromatic compound with a continuous supply of phosgene under interfacial reaction conditions, in aqueous-organic solvent at a pH of 9-12, in the presence of at least one tertiary amine, to form a mixture;
   (b) combining a monohydroxyaromatic compound with the mixture to produce an oligomeric aromatic polycarbonate mixture, with additional introduction of phosgene, wherein the amount of phosgene added in steps (a) and (b) is not more than 30% by weight of the total phosgene employed in the method;
   (c) combining a mixture of a polyorganosiloxane bis(aryl) chloroformate in aqueous-organic solvent with the oligomeric aromatic polycarbonate mixture, with additional introduction of phosgene, before 65% of the total weight of phosgene is added, to form a reaction mixture; and
   (d) adding the remainder of the phosgene to the reaction mixture, while stirring, to afford a polysiloxane-polycarbonate copolymer of a desired molecular weight;
   wherein the % solids for preparing the polysiloxane-polycarbonate copolymer is 12% to 18%,
   a molded plaque prepared from the polysiloxane-polycarbonate copolymer has a haze value of less than 1%, as measured according to ASTM D1003-07; wherein hydroxylaryl terminated polydiorganosiloxane oligomers used to produce the polyorganosiloxane bis(aryl) chloroformate have a polydispersity of less than 3.0 determined using a cross-linked styrene-divinylbenzene column with an ultraviolet-diode array detector set to detect at 254 nm.

2. The method of claim 1, wherein the dihydroxyaromatic compound is bisphenol A (BPA).

3. The method of claim 1, wherein the monohydroxyaromatic compound is selected from the group consisting of phenol, and para-cumylphenol (PCP), or a combination thereof.

4. The method of claim 1, wherein the polyorganosiloxane bis(aryl)chloroformate has formula (X)

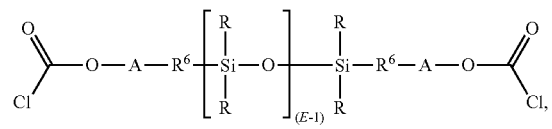

wherein
A is an unsubstituted or substituted divalent aryl group,
$R^6$ is a divalent $C_{2-8}$ alkyl group,
each R is independently a $C_{1-8}$ alkyl group, and
E is an average of 2 to 200.

5. The method of claim 1, wherein the polyorganosiloxane bis(aryl)chloroformate has formula (Y)

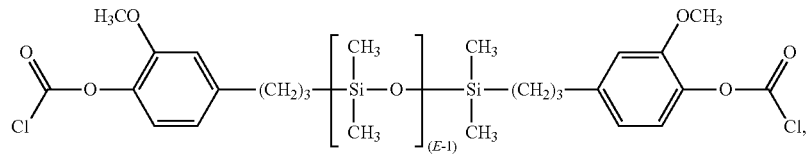

wherein E is an average of 10 to 90.

6. The method of claim 1, wherein the polyorganosiloxane bis(aryl)chloroformate is prepared by introducing into a reactor a solution of formula (Z)

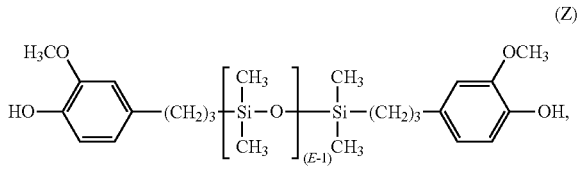

wherein E is an average of 10 to 90;

the solution comprising methylene chloride, an aqueous solution of sodium hydroxide, and phosgene, said phosgene being introduced at a rate such that the ratio of phosgene to the formula (Z) OH groups is in a range between 2.5 and 6 moles of phosgene per mole of formula (Z) OH group, said aqueous solution of sodium hydroxide having a concentration of at least 5 percent by weight sodium hydroxide, said aqueous solution of sodium hydroxide being introduced at a rate such that the molar ratio of metal hydroxide to phosgene is in a range between 3.5 and 6.

7. The method of claim 1, wherein the polysiloxane-polycarbonate copolymer is a siloxane block co-polycarbonate comprising, by weight, 1% siloxane to 20% siloxane.

8. The method of claim 1, wherein the polysiloxane-polycarbonate copolymer is
a PCP end-capped BPA polycarbonate-polydimethylsiloxane copolymer comprising 6 wt % siloxane, having an average polydimethylsiloxane block length of 45 units, and having a Mw of 17,000 g/mol to 35,000 g/mol, as determined by GPC using BPA polycarbonate standards.

9. The method of claim 1, wherein the polyorganosiloxane bis(aryl)chloroformate is added to the oligomeric aromatic polycarbonate.

10. The method of claim 1, wherein a molded plaque with 3.18 mm thickness prepared from the polysiloxane-polycarbonate copolymer has a db* value of less than 3, as measured according to ASTM D2244-09b.

11. The method of claim 1, wherein the cycle time for preparing the polysiloxane-polycarbonate copolymer is at least 18 minutes but less than 40 minutes.

12. The method of claim 1, wherein the % solids for preparing the polysiloxane-polycarbonate copolymer is 15% to 18%.

13. The method of claim 1, wherein the hydroxylaryl terminated polydiorganosiloxane oligomers used to produce the polyorganosiloxane bis(aryl)chloroformate have a polydispersity of less than 2 determined using a cross-linked styrene-divinylbenzene column with an ultraviolet-diode array detector set to detect at 254 nm.

14. The method of claim 1, wherein the cycle time for preparing the polysiloxane-polycarbonate copolymer is at least 23 minutes.

15. The method of claim 1, wherein the hydroxylaryl terminated polydiorganosiloxane oligomers used to produce the polyorganosiloxane bis(aryl)chloroformate have a polydispersity of less than 2 determined using a cross-linked styrene-divinylbenzene column with an ultraviolet-diode array detector set to detect at 254 nm, and wherein the cycle time for preparing the polysiloxane-polycarbonate copolymer is at least 23 minutes.

* * * * *